United States Patent
Bao et al.

(10) Patent No.: US 10,601,049 B2
(45) Date of Patent: *Mar. 24, 2020

(54) HIGH PERFORMANCE BATTERY ANODES WITH POLYMERIC COATINGS INCLUDING MOLECULES CROSS-LINKED THROUGH DYNAMIC BONDS

(71) Applicant: The Board of Trustees of the Leland Stanford Junior University, Stanford, CA (US)

(72) Inventors: Zhenan Bao, Stanford, CA (US); Yi Cui, Stanford, CA (US); Guangyuan Zheng, Stanford, CA (US); Chao Wang, Sunnyvale, CA (US); Jeffrey Lopez, Palo Alto, CA (US); Allen Pei, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/251,856

(22) Filed: Aug. 30, 2016

(65) Prior Publication Data

US 2017/0062830 A1    Mar. 2, 2017

Related U.S. Application Data

(60) Provisional application No. 62/212,440, filed on Aug. 31, 2015.

(51) Int. Cl.
*H01M 4/134* (2010.01)
*H01M 4/62* (2006.01)
(Continued)

(52) U.S. Cl.
CPC .......... *H01M 4/628* (2013.01); *H01M 4/134* (2013.01); *H01M 4/366* (2013.01); *H01M 4/382* (2013.01);
(Continued)

(58) Field of Classification Search
CPC ..................................................... H01M 4/382
See application file for complete search history.

(56) References Cited

U.S. PATENT DOCUMENTS 5,961,672 A * 10/1999 Skotheim .......... H01M 10/0565
29/623.5
6,509,122 B1 * 1/2003 Oyama ............... C08F 290/062
429/303
(Continued)

OTHER PUBLICATIONS

Wang et al., Self-healing chemistry enables the stable operation of silicon microparticle anodes for high-energy lithium-ion batteries, Nature Chemistry, Nov. 17, 2013, DOI:10.1038/NCHEM.1802 (Year: 2013).*

(Continued)

*Primary Examiner* — Lucas J. O'Donnell
(74) *Attorney, Agent, or Firm* — Foley & Lardner LLP; Mark J. Danielson

(57) ABSTRACT

A battery includes an anode, a cathode, and an electrolyte disposed between the anode and the cathode. The anode includes a current collector and an interfacial layer disposed over the current collector, and the interfacial layer includes a polymer including dynamic bonds.

9 Claims, 19 Drawing Sheets

(51) Int. Cl.
  *H01M 4/38* (2006.01)
  *H01M 4/66* (2006.01)
  *H01M 4/36* (2006.01)
  *H01M 10/052* (2010.01)

(52) U.S. Cl.
  CPC .......... *H01M 4/386* (2013.01); *H01M 4/661* (2013.01); *H01M 10/052* (2013.01); *Y02T 10/7011* (2013.01)

(56) References Cited

U.S. PATENT DOCUMENTS

| | | | |
|---|---|---|---|
| 2004/0058232 A1* | 3/2004 | Kim | H01M 4/04 429/137 |
| 2006/0134525 A1* | 6/2006 | Kleijnen | H01M 2/16 429/249 |
| 2016/0049217 A1 | 2/2016 | Tee et al. | |

OTHER PUBLICATIONS

Versatile One-Pot Synthesis of Supramolecular Plastics and Self-Healing Rubbers by Montarnal et al., Journal of the American Chemical Society 2009 131 (23), 7966-7967, DOI: 10.1021/ja903080c (Year: 2009).*

Ding, F. et al. (2013) "Dendrite-Free Lithium Deposition via Self-Healing Electrostatic Shield Mechanism," J. Am. Chem. Soc. 135:4450-4456.

Hirai, T. et al. (1994) "Effect of Additives on Lithium Cycling Efficiency," J. Electrochem. Soc. 141(9):2300-2305.

Ishikawa, M. et al. (2005) "Pretreatment of Li Metal Anode with Electrolyte Additive for Enhancing Li Cycleability," Journal of Power Sources 146:199-203.

Kanamura, K. et al. (1996) "Electrochemical Deposition of Very Smooth Lithium Using Nonaqueous Electrolytes Containing HF," J. Electrochem. Soc. 143(7):2187-2197.

Liang, Z. et al. (2016) "Composite Lithium Metal Anode by Melt Infusion of Lithium into a 3D Conducting Scaffold with Lithiophilic Coating," Proc. Natl. Acad. Sci. USA 113:2862-2867.

Lin, D. et al. (2016) "Layered Reduced Graphene Oxide with Nanoscale Interlayer Gaps as a Stable Host for Lithium Metal Anodes," Nature Nanotechnology 11:626-632.

Liu, Y. et al. (2016) "Lithium-Coated Polymeric Matrix as a Minimum Volume-Change and Dendrite-Free Lithium Metal Anode," Nature Communications 7:10992, 1-9.

Lu, Y. et al. (2014) "Stable Lithium Electrodeposition in Liquid and Nanoporous Solid Electrolytes," Nature Materials 13:961-969.

Mogi, R. et al. (2002) "Effects of Some Organic Additives on Lithium Deposition in Propylene Carbonate," J. Electrochem. Soc. 149(12):A1578-A1583.

Yan, K. et al. (2014) "Ultrathin Two-Dimensional Atomic Crystals as Stable Interfacial Layer for Improvement of Lithium Metal Anode," Nano Lett. 14:6016-6022.

Yan, K. et al. (2016) "Selective Deposition and Stable Encapsulation of Lithium Through Heterogeneous Seeded Growth," Nat. Energy 1:16010, 1-8.

Zheng, G. et al. (2014) "Interconnected Hollow Carbon Nanospheres for Stable Lithium Metal Anodes," Nature Nanotechnology 9:618-623.

* cited by examiner

HIGH PERFORMANCE BATTERY ANODES WITH POLYMERIC COATINGS INCLUDING MOLECULES CROSS-LINKED THROUGH DYNAMIC BONDS

CROSS-REFERENCE TO RELATED APPLICATION

This application claims the benefit of U.S. Provisional Application No. 62/212,440, filed on Aug. 31, 2015, the disclosure of which is incorporated herein by reference in its entirety.

TECHNICAL FIELD

This disclosure generally relates to flowable materials and, more particularly, to self-healing polymers and composites and applications of such polymers and composites for electrochemical energy storage devices, such as batteries.

BACKGROUND

To develop next-generation low cost electric vehicles (EVs), a fundamental revamp of today's lithium-ion battery chemistry is desired. Current battery cost for EVs is still too expensive for making EVs competitive. It is therefore desired to develop electrode materials with high specific capacity and low cost. Over the past few years, much effort has been devoted to developing various high capacity electrode materials such as lithium metal and silicon anodes, as well as sulfur and air cathodes. Among the various electrode materials, lithium metal is attractive for next-generation high-energy-density batteries, since it has the highest specific capacity and the lowest anode potential in lithium-based batteries. Development of lithium metal anode is also desired for Li-Sulfur and Li-Air batteries, which potentially can offer about 5-10 times higher specific energy than today's lithium-ion batteries. However, lithium metal anodes can suffer from dendrite growth and low Coulombic efficiency, and thus remain a roadblock for future battery applications.

It is against this background that a need arose to develop the self-healing polymers described herein.

SUMMARY

One aspect of this disclosure relates to a battery. In some embodiments, the battery includes an anode, a cathode, and an electrolyte disposed between the anode and the cathode. The anode includes a current collector and an interfacial layer disposed over the current collector, and the interfacial layer includes a polymer including dynamic bonds.

Another aspect of this disclosure relates to a battery electrode. In some embodiments, the battery electrode includes a current collector, an interfacial layer disposed over the current collector, and an electrode material disposed between the current collector and the interfacial layer. The interfacial layer includes a polymer including dynamic bonds.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

(FIG. 2A) Growth of lithium dendrites is observed for deposition on a bare electrode. (FIG. 2B) With a self-healing polymer (SHP) coating, the highly adaptive polymer provides conformal coating onto a lithium metal anode.

(FIG. 3A) Chemical structure of the SHP. Dark lines are the fatty acid backbone and boxes are urea hydrogen-bonding sites. The right hand side shows the molecular structure of the diacid and triacid backbones. (FIG. 3B) Differential scanning calorimetry (DSC) curve of the SHP showing that the $T_g$ of the SHP is about $-26°$ C., much lower than room temperature. (FIG. 3C) Frequency sweep measurement of the SHP showing the viscoelastic properties of the polymer. (FIG. 3D) Mechanical piercing of the SHP. The polymer is first laminated onto a stainless steel mesh. A needle controlled by a micromanipulator is then pushed onto the polymer. The figure shows that the viscoelastic polymer can withstand the needle without breaking.

(FIGS. 4A, 4B, 4C) Scanning electron microscope (SEM) images of about 1 $mAh/cm^2$ of lithium deposited at about 1 $mA/cm^2$ on (FIG. 4A) a bare copper electrode (FIG. 4B) a self-healing polymer modified electrode. (FIG. 4C) A lower magnification image of (FIG. 4B) showing a large area of substantially uniform deposition. (FIGS. 4D, 4E, 4F) SEM images of about 2 $mAh/cm^2$ of lithium deposited at (FIG. 4D) about 2 $mA/cm^2$, (FIG. 4E) about 3 $mA/cm^2$ and (FIG. 4F) about 5 $mA/cm^2$. (FIG. 4G) X-ray photoelectron spectroscopy (XPS) analysis of lithium deposition with depth profiling.

(FIG. 5A) Lithium deposition/dissolution voltage profiles for a SHP coated electrode and a control electrode. (FIG. 5B) Impedance spectra of the two electrodes after 50 cycles of lithium deposition/stripping. (FIG. 5C) Cyclic voltammetry of the SHP modified electrode with lithium metal as the reference and counter electrode. (FIG. 5D) Fourier transform infrared (FTIR) spectra of the SHP before and after lithium cycling. (FIG. 5E) Cycling Coulombic efficiency of the lithium anode with and without the SHP modification.

(FIG. 6A) Optical microscope images showing a self-healing process of an artificially created pinhole on a SHP. (FIGS. 6B, 6C) Digital camera images showing the effect of a pinhole free coating of a polymer on a lithium metal foil. The lithium foil on the left side is coated with the SHP and the right side is the control lithium foil. The images show the air stability of the polymer coated lithium foil before (FIG. 6B) and after (FIG. 6C) about 30 mins of exposure to ambient air. (FIGS. 6D, 6E) Numerical simulation of the evolution of lithium dendrite growth in the case where a pinhole is created on a lithium SEI layer. Dendrite growth is observed at the cracked location (FIG. 6E). (FIGS. 6F, 6G) Numerical simulation of the effect of polymer coating on the lithium metal anode, in the case of where an identical pinhole is created. Dendrite growth is significantly suppressed with the polymer coating (FIG. 6G).

(FIG. 8A) Comparison of frequency sweeps for SHPs with varied amounts of urea.

The polymer with less urea is significantly softer with lower storage and loss moduli and a higher crossover frequency. This is likely a result of a reduced number of hydrogen bonding groups in the material. (FIG. 8B) Comparison of frequency sweeps of a SHP as water is absorbed during storage in ambient conditions. Water softens the material but it does not change the overall viscoelastic properties.

(FIG. 9A) Comparison of the stress relaxation for SHPs with varied amounts of urea. Again, the polymer with less urea is softer. (FIG. 9B) Comparison of the stress relaxation of a SHP as water is absorbed during storage in ambient conditions.

(FIG. 10A) SEM images of lithium deposition on a SHP-modified electrode in a pouch cell configuration. (FIG. 10B) Zoom in image of (FIG. 10A).

(FIG. 11A) On a control electrode, the initial deposited lithium appears irregular in shape and is much more dispersed. (FIG. 11B) On an electrode modified with a SHP, the initial lithium deposit is highly dense and uniform.

(FIG. 13A) Schematic diagram of the simulation setup. The bottom electrode is covered with a polymer layer with different lithium ion conductivity. The simulation focuses on the region adjacent to the lithium substrate. (FIG. 13B) By simulating electrodeposition at different values of electrolyte ionic conductivity, a positive correlation is observed between the variance of the nucleation sites and the ionic conductivity. (FIG. 13C) Screen shot of the computational cell at 5 µS/cm. (FIG. 13D) Screen shot of the computational cell at 0.5 µS/cm.

FIGS. 14A-14D show the control electrode and SHP-coated electrode after 60 s and 10,000 s of Li deposition, respectively. The time disparity is due to the high impedance of the SHP-coating restricting Li deposition relative to the non-coated condition.

(FIG. 15A) Growth of lithium dendrites is observed for deposition on a bare electrode. (FIG. 15B) With a SHP composite coating, the highly adaptive polymer provides conformal coating onto the lithium metal anode.

(FIG. 17A) Chemically modification of graphene oxide. (FIG. 17B) Preparation of self-healing graphene oxide composites.

(FIG. 18A) Schematic illustration of a SHP. (FIG. 18B) Proposed synthetic route of the polymer backbone. (FIG. 18C) Example choices of hydrogen bonds. (FIG. 18D) Example structures for covalent cross-linking sites.

(FIG. 19A) Schematic diagrams showing the morphology of lithium deposition on an electrode with a SHP (left) and a control electrode (right). (FIGS. 19B, 19C) SEM images of a lithium metal anode with (FIG. 19B) and without (FIG. 19C) the SHP. (FIG. 19D) Comparison of cycling Coulombic efficiency for different types of lithium metal anodes.

(FIG. 20A) Synthetic route of a polymer backbone and schematic illustration of a resulting supramolecular network with urea hydrogen bonding sites. (FIGS. 20B, 20C) Example alternatives to an oleic acid backbone.

DETAILED DESCRIPTION

Self-Healing Polymers and Composites

Figure 1A:
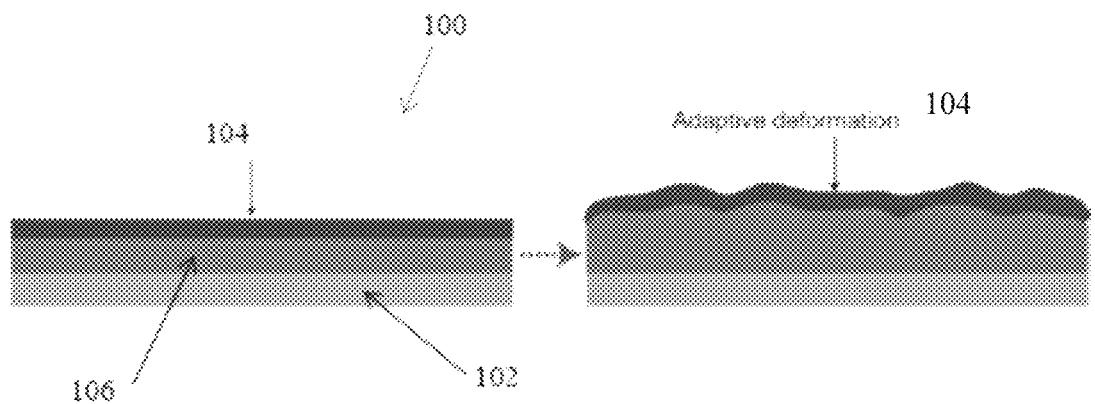
FIG. 1A. Schematic of an embodiment of a lithium metal anode.

Embodiments of this disclosure relate to self-healing polymers, self-healing composites formed of such self-healing polymers, and applications of such polymers and composites for electrochemical energy storage devices, such as batteries. In some embodiments, a self-healing polymer includes a cross-linked polymeric matrix, and a self-healing composite includes a cross-linked polymeric matrix and fillers dispersed in the matrix. Upon damage of the polymer or composite, the polymer or composite self-heals without the need to apply external stimuli or the use of chemical agents to promote self-healing and damage repair. Advantageously, some embodiments of the polymer or composite can demonstrate repeatable self-healing under ambient conditions, such as at or around room temperature.

A self-healing polymer of some embodiments includes a cross-linked polymeric matrix that is formed from molecules including associative groups. In forming the matrix, the molecules interact with one another through their associative groups to form a polymeric network. An associative group of one molecule interacts with an associative group of another molecule to provide intermolecular bonds or links between the molecules. An associative group of one molecule also can interact with multiple other associative groups, such as associative groups of two or more molecules to provide intermolecular bonds or links between three or more molecules. In some embodiments, the resulting polymeric network can be referred to as a supramolecular polymeric network that is held together by bonds between associative groups.

In a cross-linked matrix of some embodiments, molecules interacts with one another (through their associative groups) by reversible (or dynamic), relatively weak bonds, such as non-covalent bonds. Accordingly, the cross-linked matrix is predominately held together by non-covalent bonds. In some embodiments, the non-covalent bonds between molecules can be hydrogen bonds. However, it is contemplated that other types of reversible (or dynamic), relatively weak bonds, such as coordination bonds (e.g., metal-ligand bonds) or electrostatic interactions, can occur in addition to, or in place of, hydrogen bonds. More generally, suitable reversible, weak bonds include those having a bonding strength in the range of about 4 kJ/mol to about 100 kJ/mol, such as from about 4 kJ/mol to about 50 kJ/mol, from about 10 kJ/mol to about 50 kJ/mol, from about 10 kJ/mol to about 30 kJ/mol, from about 30 kJ/mol to about 50 kJ/mol, from about 50 kJ/mol to about 100 kJ/mol, from about 50 kJ/mol to about 70 kJ/mol, or from about 70 kJ/mol to about 100 kJ/mol. Molecules forming a cross-linked matrix also can interact with one another (through their associative groups) by covalent bonds, thereby providing improved mechanical strength to the matrix. Further, molecules forming a cross-linked matrix can interact with fillers through their associative groups by forming reversible, weak bonds, such as hydrogen bonds, or by forming covalent bonds.

By cross-linking through reversible, weak bonds, a supramolecular polymeric network provides a self-healing function via these weak bonds, which break preferentially (instead of stronger covalent bonds) during a mechanical damage event. These 'broken' bonds can dynamically associate and dissociate to provide a healing mechanism at a damaged site. Additionally, a low glass transition temperature ($T_g$) allows polymer chains near a damaged site to rearrange, approach, wet, and diffuse, thereby allowing healing under ambient temperatures. $T_g$ of a self-healing polymer can be adjusted according to a number or a density of associative groups, thereby controlling an extent of cross-linking. In some embodiments, $T_g$ of a self-healing polymer (as measured in the absence of fillers) can be no greater than about 25° C., such as from about −100° C. to about 25° C., from about −100° C. to about −50° C., from about −100° C. to about −25° C., from about −50° C. to about 25° C., from about −50° C. to about 0° C., or from about 0° C. to about 25° C. In some embodiments, $T_g$ of a self-healing composite (as measured in the presence of fillers that are dispersed in a self-healing polymer) can be somewhat higher relative to that of the self-healing polymer alone, although the above listed ranges of temperatures remain generally applicable. Depending on the particular application, it is also contemplated that $T_g$ of self-healing polymers and composites above about 25° C. can be suitable.

Molecules forming a cross-linked matrix typically include multiple associative groups per molecule. Each molecule can include at least two associate groups and can include three, four, five, or more associative groups. The associative groups can be included in a backbone of the molecule, or can be pendant or terminal groups attached to the backbone. For example, a molecule including two associative groups can be referred to as a bidentate molecule, and each such bidentate molecule can associate with two other bidentate molecules to form a chain-like network. By including a mixture of bidentate and multidentate molecules, a three-dimensional polymeric network can be formed.

In the case of hydrogen bonds, associative groups including a hydrogen atom bonded to an electronegative atom, such as nitrogen or oxygen, can serve as hydrogen donating groups, while associative groups including an atom with a lone pair of electrons can serve as hydrogen accepting groups. The interaction between a hydrogen donating group and a hydrogen accepting group results in the formation of a hydrogen bond.

In some embodiments, associative groups of molecules can be selected from halogen, oxygen, and nitrogen-containing functional groups. In some embodiments, associative groups can be selected from hydroxyl, amine, and carbonyl-containing functional groups. Associative groups of a molecule can be of the same type, or can be a combination of different types. In some embodiments, associative groups of molecules can be carbonyl-containing functional groups. Carbonyl-containing functional groups include the moiety C=O. Examples of carbonyl-containing functional groups include amide, ester, urea, ureidopyrimidone, and carboxylic acid functional groups. The C=O moiety of carbonyl-containing functional groups can serve as hydrogen acceptors for the formation of hydrogen bonds, as the oxygen atom of the carbonyl group includes a lone pair of electrons. In some embodiments, associative groups of molecules can be selected from amine, amide, urea, and ureidopyrimidone functional groups. Amine, amide, urea, and ureidopyrimidone functional groups include the moiety —NHR, where R can be hydrogen or a moiety different from hydrogen. The —NHR moiety can serve as a hydrogen donor in the formation of hydrogen bonds, as it includes a hydrogen atom bonded to an electronegative nitrogen atom. It should be noted that the same type of associative group can serve as both a hydrogen acceptor and a hydrogen donor. For example, amide, urea, and ureidopyrimidone functional groups include the C=O moiety, which can serve as a hydrogen acceptor, as well as the —NHR moiety, which can serve as a hydrogen donor.

In general, a cross-linked matrix can be formed of any type of molecule including suitable associative groups. In some embodiments, the cross-linked matrix can be formed of one type of molecule. In other embodiments, the cross-linked matrix can be formed of a mixture of two or more different types of molecules. Molecules can be prepared synthetically, or can be derived from natural sources. In some embodiments, molecules can be macromolecules that are oligomeric or polymeric. Oligomers and polymers are typically formed from polymerization of one or more types of monomers. Oligomers typically include fewer monomer units than polymers and, therefore, are typically of lower molecular weight. As an example, oligomers can include from 2 to 10 monomer units, while polymers can include more than 10 monomer units. Synthetically prepared molecules can be formed using a number of different techniques, such as free radical, ionic, ring opening, allyl addition or condensation polymerization techniques. Molecules also can be formed using synthetic techniques, such as Diels-Alder or click chemistry techniques.

In some embodiments, desirable molecules include those having sufficient flexibility to allow molecules near a damaged site to rearrange, approach, and bring their associative groups into close proximity, thereby allowing bonding between the associative groups and self-healing. For example, a desirable molecule can include a saturated hydrocarbon moiety, such as an alkylene moiety (e.g., an alkylene straight chain in the form of —$(CH_2)_n$— with n in the range of 1 to 40, 1 to 20, or 1 to 10, as well as other $C_{1-40}$, $C_{1-20}$, and $C_{1-10}$ alkylene moieties), or a flexible oligomeric or polymeric chain, such as a polyamide, polyester, polyurethane, polyalkylene imine, polyalkylene oxide, polyolefin, or polysiloxane chain. A desirable molecule also can include a flexible portion attached to a relatively inflexible portion, such as an unsaturated hydrocarbon moiety or a cyclic moiety, provided the flexible portion imparts sufficient flexibility for self-healing. A self-healing polymer of some embodiments can include segments that promote Li ion transport, such as poly(alkylene oxide) (e.g., poly(ethylene oxide) or poly(propylene oxide)), poly(ethylenimine), and combinations thereof. A self-healing polymer of some embodiments can include or can be substituted with halo groups (e.g., fluoro groups), which can improve stability of a lithium metal anode by, for example, reacting with lithium metal to form lithium fluoride.

As explained above, a self-healing composite of some embodiments of this disclosure includes fillers dispersed in a cross-linked matrix to provide enhanced mechanical strength to the composite. The fillers can be dispersed among molecules forming the cross-linked matrix, or can serve as cross-linking sites for cross-linking the molecules. Depending on the particular application, a single type of filler can be included, or two or more different types of fillers can be included.

Fillers can include organic or inorganic microstructures, organic or inorganic nanostructures, and combinations of microstructures and nanostructures. The inclusion of fillers can impart desirable mechanical properties to a resulting composite, such as in terms of improvement in strength. For example, fillers can be formed of a metal oxide, a non-metal oxide, a metal nitride, a non-metal nitride, a graphitic material, or a combination of two or more of such materials. Examples of suitable fillers include graphene oxide nanosheets, metal oxide nanoparticles, $SiO_2$ nanoparticles, boron nitride nanosheets, clay, nanodiamond, layered inorganic materials, and so forth.

In some embodiments, fillers can be included in a self-healing composite at a volume loading level in the range of about 0.5% to about 50% by volume of the composite, such as from about 0.5% to about 15%, from about 5% to about 15%, from about 10% to about 15%, from about 15% to about 50%, from about 15% to about 30%, from about 20% to about 30%, from about 30% to about 40%, or from about 30% to about 50%. In some embodiments, fillers can be included in a self-healing composite at a weight loading level in the range of about 0.5% to about 90% by weight of the composite, such as from about 0.5% to about 35%, from about 5% to about 35%, from about 10% to about 35%, from about 35% to about 90%, from about 35% to about 70%, from about 50% to about 70%, or from about 35% to about 50%.

Self-healing polymers and composites of some embodiments of this disclosure can exhibit a number of desirable properties. For example, a self-healing polymer or composite can be partially or fully viscoelastic in some embodiments. As another example, a self-healing polymer or composite can be relatively soft with a Young's modulus of up to about 1 GPa, up to about 0.9 GPa, up to about 0.8 GPa, up to about 0.7 GPa, up to about 0.6 GPa, up to about 0.5 GPa, up to about 0.4 GPa, up to about 0.3 GPa, up to about 0.2 GPa, up to about 0.1 GPa, or up to about 0.05 GPa, and down to about 0.01 GPa, down to about 0.005 GPa, or less. As another example in terms of stretchability, a self-healing polymer or composite can have a relatively high percentage elongation-at-break of at least about 20%, at least about 30%, at least about 40%, at least about 50%, at least about 60%, at least about 70%, at least about 80%, at least about 90%, at least about 100%, at least about 150%, or at least about 200%, and up to about 300%, up to about 400%, up to about 500%, or more. As another example, a self-healing polymer or composite can have a rheology that is liquid-like, with a loss modulus ($G''$) greater than a storage modulus ($G'$) at a temperature below about 80° C., such as at or below about 75° C., at or below about 50° C., or at or below about 25° C., and a frequency below about 10 Hz, such as at or below about 5 Hz or at or below about 1 Hz.

Applications of Self-Healing Polymers and Composites

Some embodiments of this disclosure relate to improved lithium metal anodes and the incorporation of such anodes in electrochemical energy storage devices, such as batteries. Some embodiments of this disclosure can effectively address the challenges of lithium metal anodes that otherwise can lead to low Coulombic efficiency, short cycle life, and safety concerns resulting from lithium dendrite formation. Batteries incorporating such improved anodes can show high Coulombic efficiency that is retained over extended cycling, and can show little or no formation of lithium dendrites at practical current densities. Together with the high specific capacity of lithium metal, batteries incorporating such improved anodes are desirable for use in various applications, including portable electronics, electric vehicles, and grid storage, among others.

Referring to an embodiment of FIG. 1A, a lithium metal anode 100 is provided, including a current collector 102 and a protective, interfacial layer or coating 104 disposed over and covering at least a portion of a top surface of the current collector 102. The current collector 102 can be formed of a metal (e.g., copper), a metal alloy, or other suitable electronically conductive material. As shown in FIG. 1A, an anode material 106, which corresponds to lithium metal in this embodiment, is disposed between the current collector 102 and the interfacial layer 104, and is deposited on the current collector 102 during cycling.

In the embodiment of FIG. 1A, the interfacial layer 104 is formed as a flexible or stretchable film having a largely flat or planar configuration. The interfacial layer 104 separates or isolates lithium metal deposition and dissolution beneath the interfacial layer 104 from an electrolyte above the interfacial layer 104. Here, the interfacial layer 104 is formed of a self-healing polymer or composite as a polymeric interfacial layer, although, more generally, the interfacial layer 104 can be formed of a flowable or viscoelastic polymer or composite. A combination of different materials is also contemplated, such as within different layers. The interfacial layer 104 readily allows the passage of lithium ions to afford rapid ion transport, while possessing stretchability and softness to accommodate and sustain the pressure induced by any lithium dendrite formation, as well as possessing rapid self-healing capability to quickly heal a damaged site induced by any lithium dendrite formation. In the embodiment of FIG. 1A, the interfacial layer 104 covers at least about 95% of the top surface of the current collector 102, such as at least about 96%, at least about 97%, at least about 98%, at least about 99%, or about 100%, although the extent of coverage of the current collector 102 can be varied for other embodiments.

The interfacial layer 104 is loosely or weakly bound to the current collector 102 and can move up and down to adjust the availability of spaces during cycling. High stretchability of the interfacial layer 104 allows the interfacial layer 104 to accommodate the volumetric expansion of lithium metal deposition with little or no mechanical damage. The interfacial layer 104 can have a thickness in the range of about 1 nm to about 100 μm, such as about 10 nm to about 100 μm, about 50 nm to about 90 μm, about 50 nm to about 80 μm, about 50 nm to about 70 μm, about 50 nm to about 60 μm, about 50 nm to about 50 μm, about 50 nm to about 40 μm, about 50 nm to about 30 μm, about 100 nm to about 30 μm, about 200 nm to about 30 µm, about 200 nm to about 20 µm, about 200 nm to about 15 µm, about 200 nm to about 10 µm, about 200 nm to about 5 µm, about 200 nm to about 3 µm, or about 500 nm to about 3 µm.

Additional embodiments of this disclosure relate to improved silicon anodes and the incorporation of such anodes in electrochemical energy storage devices, such as batteries. For example, Si microparticles are desirable for low cost and high capacity Si anodes, but suffer from particle fracture during electrochemical cycling, leading to severe battery capacity decay. Some embodiments are directed to encapsulating Si microparticles using a conformal layer or coating of a self-healing polymer or composite.

Figure 1B:
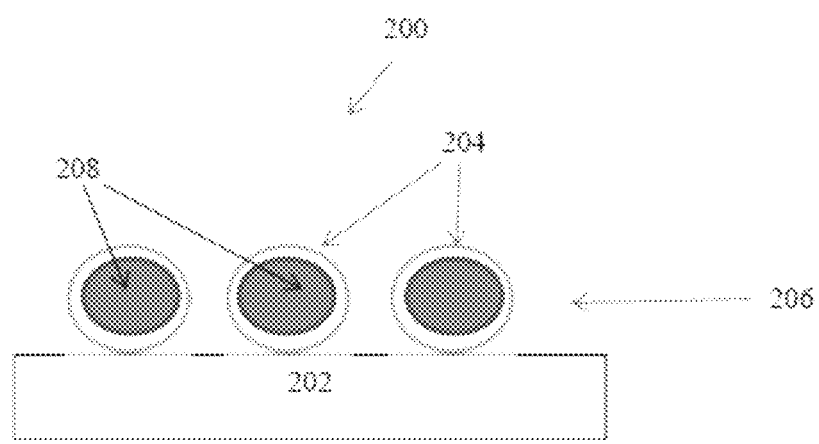
FIG. 1B. Schematic of an embodiment of a silicon anode.

Referring to an embodiment of FIG. 1B, a silicon anode 200 is provided, including a current collector 202 and an anode material 206, which corresponds to Si microparticles 208 that are disposed over the current collector 202. In this embodiment, the Si microparticles 208 are individually encapsulated by a protective, interfacial layer or coating 204 conformally covering the Si microparticles 208. It is also contemplated that multiple ones of the Si microparticles 208 can be encapsulated together by a common interfacial layer, or a layer of the Si microparticles 208 can be covered by an interfacial layer.

The interfacial layer 204 readily allows the passage of lithium ions to afford rapid ion transport, while possessing stretchability and softness to accommodate and sustain the pressure induced by expansion and fracture of Si within the interfacial layer 204, as well as possessing rapid self-healing capability to quickly heal a damaged site induced by such expansion. More generally, the interfacial layer 204 can be formed of a flowable or viscoelastic polymer or composite.

More generally, self-healing polymers and composites can be used to provide a protective function to a variety of battery electrode materials, including anode materials such as lithium metal, silicon, silicon oxide, tin, tin oxide, germanium, magnesium, and aluminum, as well as cathode materials. Battery electrode materials can be provided in the form of nanostructures, microstructures, or a combination of nanostructures and microstructures.

Figure 1C:
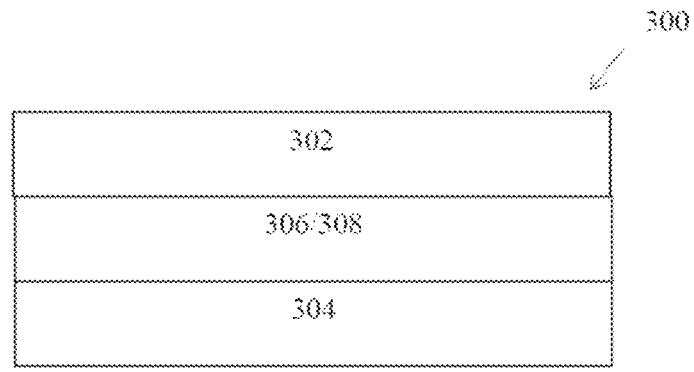
FIG. 1C. Schematic of an embodiment of a battery.

The electrodes described herein can be used for a variety of batteries and other electrochemical energy storage devices. As shown in an embodiment of FIG. 1C, a battery 300 includes a cathode 302, an anode 304, and a separator 306 that is disposed between the cathode 302 and the anode 304. The battery 300 also includes an electrolyte 308, which is disposed between the cathode 302 and the anode 304. The anode 304 can be a lithium metal anode or a silicon anode as described herein. A self-healing polymer or composite can be coated onto the anode 304, coated onto the separator 306, or both. A self-healing polymer also can be formed in-situ during cycling, such as from derivatives or precursors that are included in the electrolyte 308.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

High Performance Lithium Metal Anode with Adaptive Polymer Coating

Overview:

The future development of low cost, high performance electric vehicles depends on the successful application of next-generation lithium-ion batteries with higher energy density. The lithium metal anode is important to the successful application of these new battery technologies. However, the problems of lithium dendrite growth and low Coulombic efficiency have proven to be difficult challenges to overcome. Fundamentally, these two issues stem from the instability of a solid electrolyte interphase layer, which is readily damaged by the large volumetric changes during battery cycling. In this example, it is demonstrated that by applying a highly viscoelastic self-healing polymer to the lithium metal anode, the morphology of lithium deposition can be significantly improved. At a high current density of about 5 mA/cm$^2$, a flat and dense lithium metal layer is obtained that results in improved electrochemical performance, while a stable cycling Coulombic efficiency of about 97% is maintained for more than about 180 cycles at a current density of about 1 mA/cm$^2$.

Introduction:

Improved battery technology is a driver for the implementation of low cost electric vehicles (EVs), which currently use batteries costing about $400/kWh. To lower this cost and make EVs competitive with internal combustion engine vehicles, it is desirable to develop new electrode materials with high capacity and low cost such as lithium (Li) metal and silicon anodes as well as sulfur and air cathodes. Specifically, the Li metal anode is a promising candidate for next-generation high-energy-density batteries because it has the highest theoretical specific capacity (about 3860 mAh/g) and the lowest potential (0 V vs. Li/Li$^+$) among negative electrode materials for Li-ion batteries. Successful application of Li metal anodes will allow many advanced battery technologies (Li—S and Li-Air) that can potentially offer about 5-10 times higher specific energy as compared to today's best lithium-ion batteries and help reduce battery cost to meet the government target of <about $150/kWh.

Figure 2A:
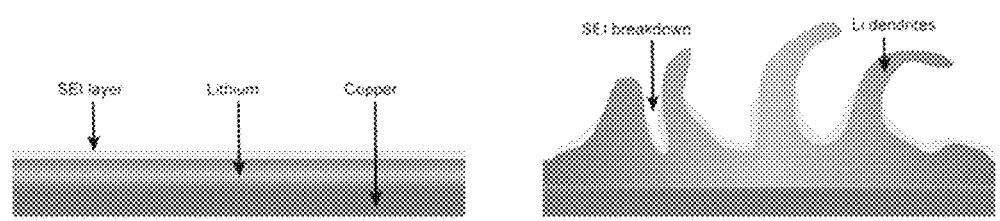
FIGS. 2A-2B. Schematic diagrams of lithium deposition.

However, the problems of dendrite growth and low Coulombic efficiency (CE) have made Li metal anodes difficult to commercialize. A particular challenge for ensuring high performance of Li metal anodes is the formation of a stable, uniform solid electrolyte interphase (SEI) layer on the Li surface that can withstand the large volumetric change during cycling. Local variations in the SEI layer composition can lead to non-uniform deposition of Li due to changes in Li-ion conductivity across the electrode or breakage of the SEI (FIG. 2A). These SEI defects facilitate the growth of high-surface area Li dendrites that increase electrolyte decomposition and cause the accumulation of dead Li, leading to increased impedance and capacity loss. The resulting dendrites can also eventually punch through a battery separator causing short-circuiting and thermal runaway.

Other approaches to reduce lithium dendrite growth include modifying electrolyte formulations and using electrolyte additives to improve morphology through the formation of a soft SEI, lithium halides, or electrostatically shielding layers. Nevertheless, the effect of these additives on improving lithium deposition was observed at relatively low current densities (0.1-0.5 mA/cm$^2$). Alternatively, bulk host materials have been proposed to address the issue of large volume changes in the lithium metal anode, but do not directly address dendrite growth. High current densities of about 3 mA/cm$^2$ and above are desired; however, such high current cycling can impart more strain on an interfacial stability of the lithium metal anode, and reducing cracking of a SEI layer demands a more innovative approach. Here, this example demonstrates a method to improve Li metal cycling by using a highly adaptive polymer layer on the electrode. The self-healing polymer used here is highly viscoelastic, which provides a substantially pinhole free coating on the Li surface during repeated charging and discharging. With the polymer, substantially uniform Li deposition is achieved at high current densities of about 5 mAh/cm$^2$. The dendrite-free deposition of lithium metal also leads to extended electrochemical cycling and stable CE.

Figure 2B:
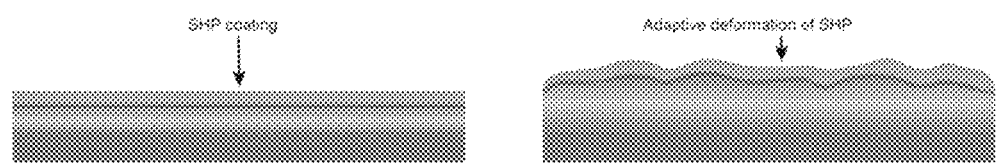

Self-Healing Polymer Design and Characterization:

The self-healing polymer (SHP) used here is a hydrogen-bonding supramolecular polymer with a low glass transition temperature ($T_g$). This low Tg allows polymer chains to have mobility in the solid state at room temperature. Upon mechanical stress, the weaker hydrogen bonds will break before any covalent bonds, and once the damaged locations are brought together again, the broken hydrogen bonds can reform across the interface. This reformation of the supramolecular polymer structure and resulting chain diffusing across a fracture site restores the mechanical properties of the polymer and is highly repeatable. Furthermore, by controlling the density of hydrogen bonds, the mechanical strength, viscoelasticity, healing speed and stretchability of the polymers can be tuned. When coated onto a lithium metal electrode, the SHP serves as a flexible and adaptive surface layer (FIG. 2B). The self-healing and viscoelastic properties of the SHP mitigate against the formation of cracks or pinholes in the SEI layer, inhibiting dendrite formation and mitigating against the creation of "hot spots" where lithium ion flux is dramatically increased. Upon repairing a pinhole or SEI defect, the reduced ionic conductivity of the SHP compared to that of the liquid electrolyte serves to homogenize the local current density and suppress the amplification of lithium growth.

Figure 3A:
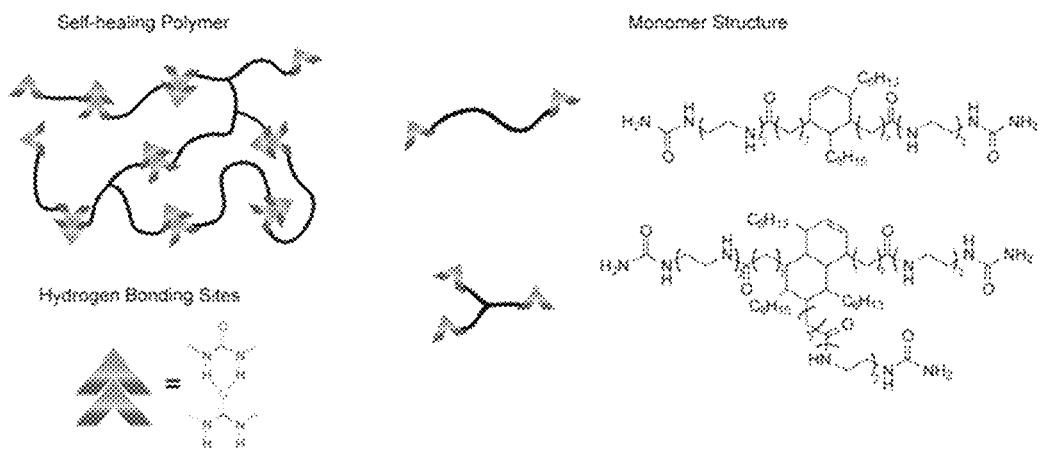
FIGS. 3A-3D. Physical properties of a SHP.

The SHP used here also can provide benefits for Si negative electrodes in Li-ion batteries (FIG. 3A). The synthesis of the SHP here is modified to yield materials on a larger scale with less batch-to-batch variation using a mechanical stir rod and a controlled reaction atmosphere. The first step includes a condensation reaction between branched oleic acids and diethylene triamine to obtain the polymer backbone. This intermediate product is then reacted with a controlled amount of urea to produce a viscoelastic self-healing material.

Figure 3B:
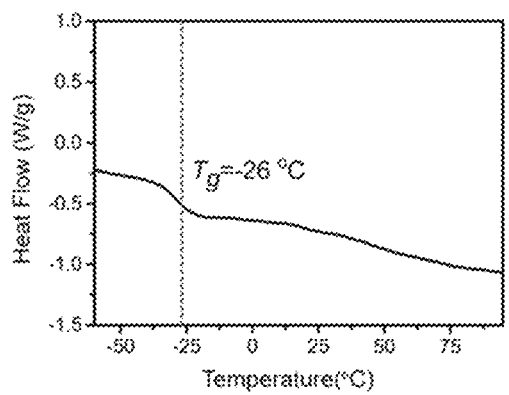
Figure 3C:
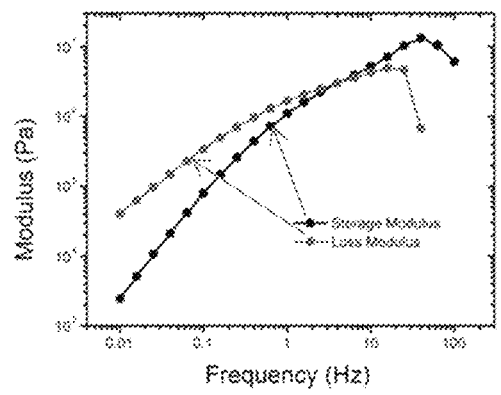
Figure 3D:
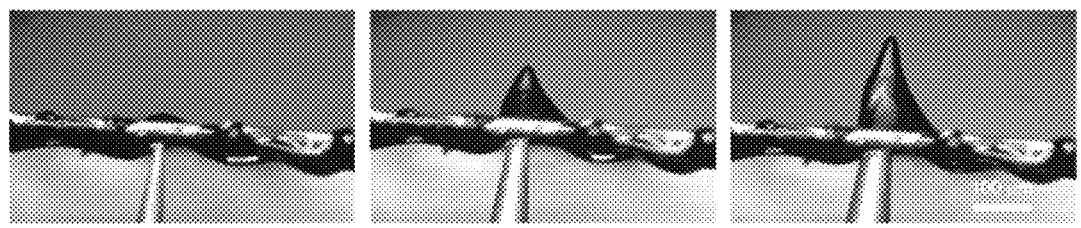
Figure 9A:
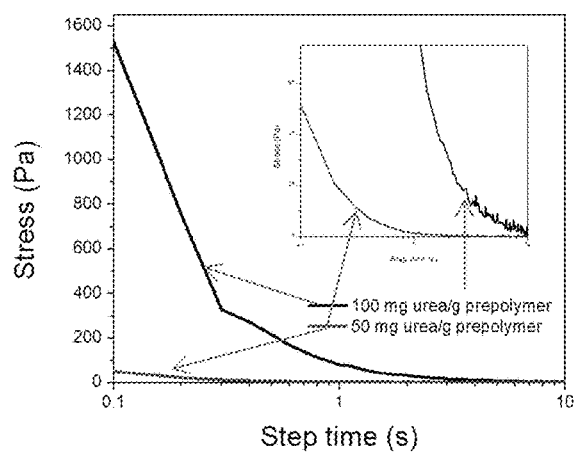
FIGS. 9A-9B. Stress Relaxation.
Figure 9B:
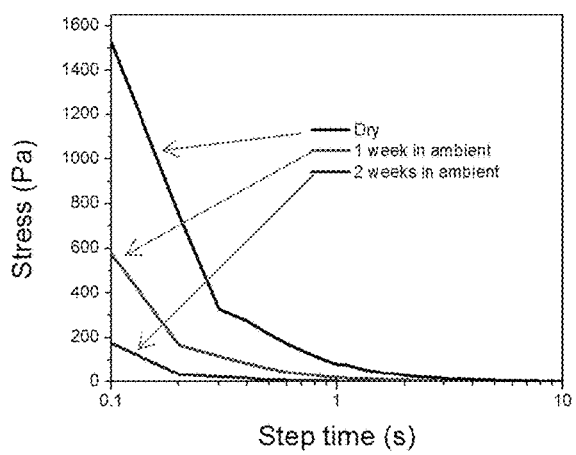

In supramolecular self-healing materials, the self-healing can occur when the supramolecular associations are quickly reversible. In the case of the hydrogen bonding material of this example, the polymer chains should be mobile so that the bonding groups can diffuse through the material and find complementary bonding groups. The SHP has been designed to have a low $T_g$, measured at about −26° C. so that this process can occur at room temperature (FIG. 3B). To further characterize the viscoelasticity of the SHP, oscillatory frequency sweep and stress relaxation experiments were carried out. The SHP shows typical viscoelastic behavior at about 1% strain over a frequency range of about 0.01 to about 100 Hz (FIG. 3C). The loss modulus (G"), or liquid-like characteristics, of the material dominate at low and intermediate frequencies until the crossover point near about 1 Hz where the storage modulus (G') becomes higher and the material transitions to more solid-like behavior at short timescales. Stress relaxation experiments illustrate the highly liquid-like bulk properties of the material with quick and substantially complete relaxation occurring very quickly after less than about 10 seconds (FIGS. 9A-9B). This substantially fully plastic deformation comes from the fast rearrangement of the hydrogen bonding groups that create the polymer structure. To illustrate the polymer's stretchability, the SHP is coated onto a stainless steel mesh and the polymer is pushed through the mesh with a needle (FIG. 3D). The optical images show that the polymer is highly stretchable even under the large local strains provided by the high aspect ratio needle.

Figure 4A:
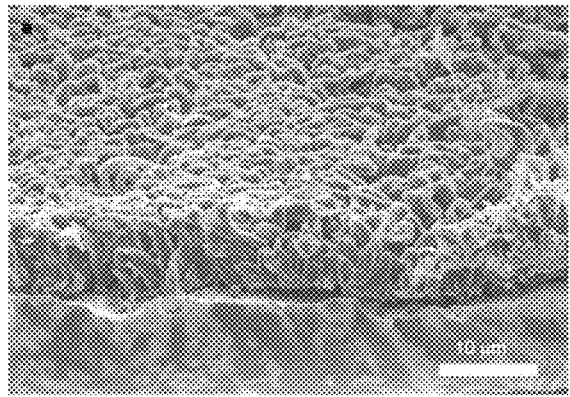
FIGS. 4A-4G. Characterization of lithium deposition.
Figure 4B:
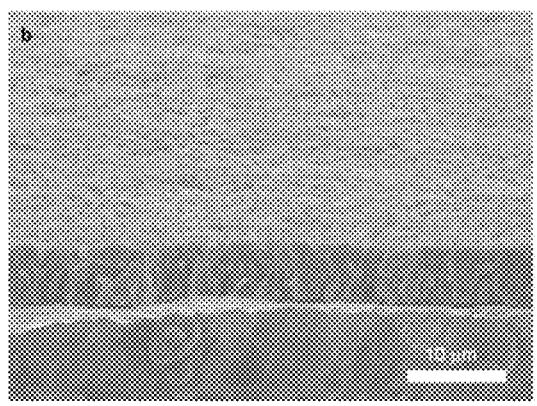
Figure 4C:
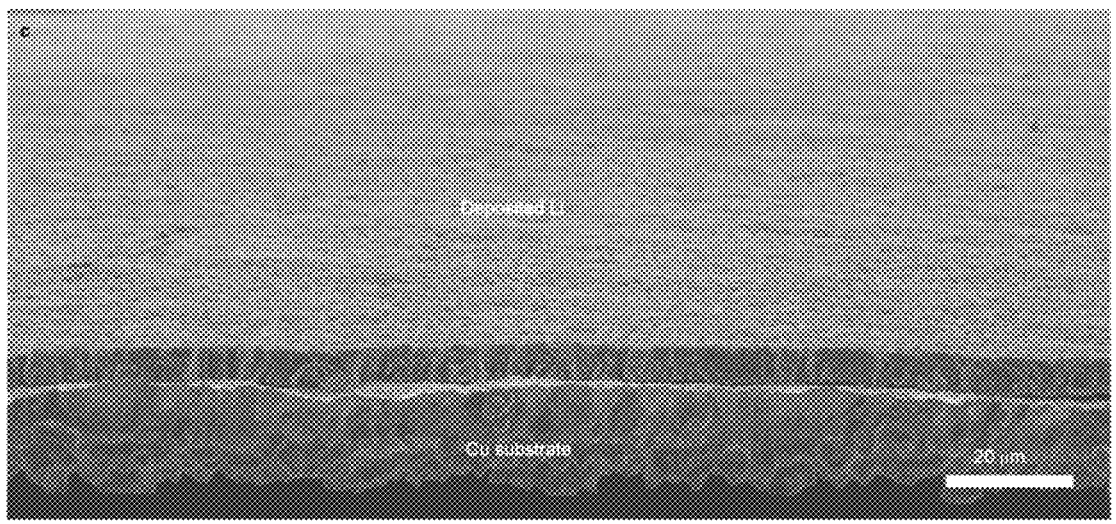

SHP Evaluation in Li Half Cells:

For electrochemical testing of the SHP on lithium metal anode, a thin layer (about 3 µm, calculated using the SHP density of about 1.1 g/cm$^3$) of the SHP is spin coated onto a copper (Cu) current collector from a solution of ethanol and chloroform (about 1:1) at a concentration of about 250 mg/mL. To study the effect of the SHP on the lithium deposition, the morphology was examined under scanning electron microscope (SEM). The electrodes were assembled in 2032 coin cells with lithium metal as both the reference and counter electrode and Li was deposited on the SHP modified electrodes at a current of about 1 mA/cm$^2$. FIGS. 4A-4C show the morphology of the Li on the SHP modified and control (bare Cu) electrode. The large volumetric expansion of lithium deposition causes breakdown of the SEI, resulting in localized areas of high lithium ion flux and corresponding growth of dendrites. The fresh surface of the dendritic lithium is quickly passivated by the electrolyte with a new SEI layer, impeding the lithium from closely packing together. With about 1 mAh/cm$^2$ of lithium deposited, the resulting structure on the control electrode shows a highly porous morphology (FIG. 4A), which significantly increases the surface area of the Li metal and consumes more Li and electrolyte in undesirable side reactions.

Figures 4D, 4E, 4F:
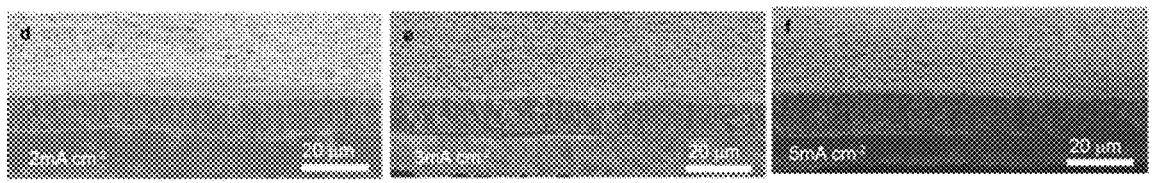
Figure 10A:
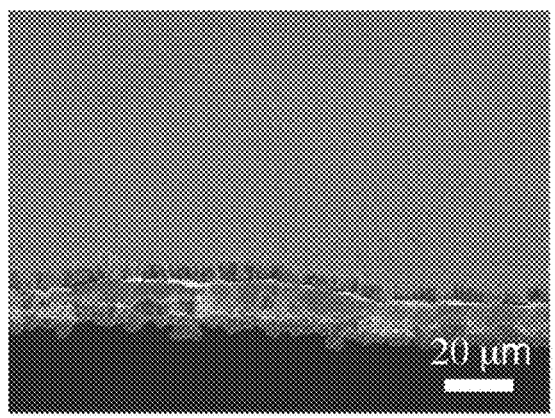
FIGS. 10A-10B.
Figure 10B:
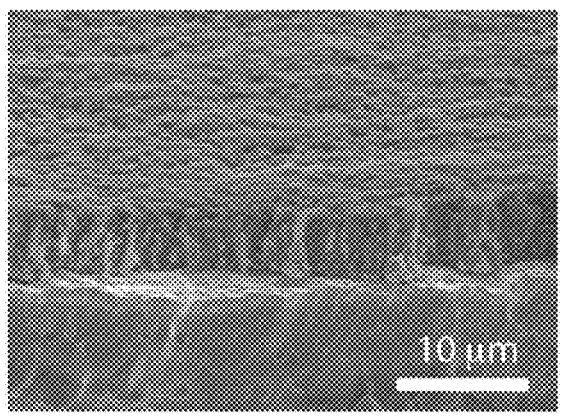

On the other hand, deposition of lithium onto the modified electrode resulted in a much smoother and uniform morphology (FIGS. 4B, 4C). The highly viscoelastic polymer forms a uniform coating onto the lithium metal and serves as an artificial SEI layer that is soft and highly stretchable. It is interesting to note that the thickness of lithium deposition on the SHP modified electrode is about 5.1 µm, which close to its theoretical value of about 5 µm for about 1 mAh/cm$^2$ of Li. In order to suppress the effect of compression pressure in the resulting lithium morphology, the lithium deposition experiment is carried out in a pouch cell. The resulting lithium morphology is similar to that in a coin cell, confirming the effectiveness of the self-healing polymer in improving the lithium deposition behavior (FIGS. 10A-10B). The effect of uniform lithium deposition is consistently observed even at higher current density and high areal capacity. FIGS. 4D, 4E, and 4F show the morphology of about 2 mAh/cm$^2$ of deposited lithium at about 2 mA/cm$^2$, about 3 mA/cm$^2$ and about 5 mA/cm$^2$, respectively.

Figure 11A:
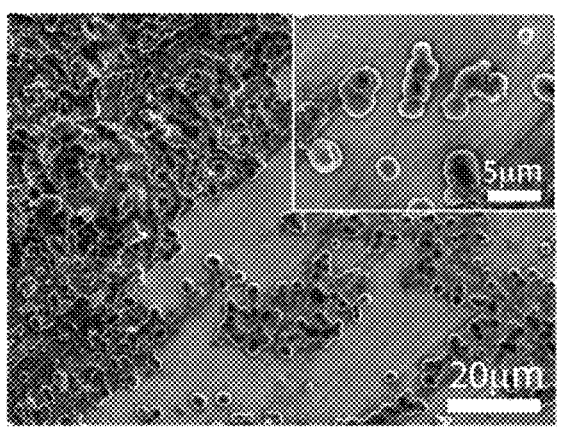
FIGS. 11A-11B. Morphology of initial lithium deposition.
Figure 11B:
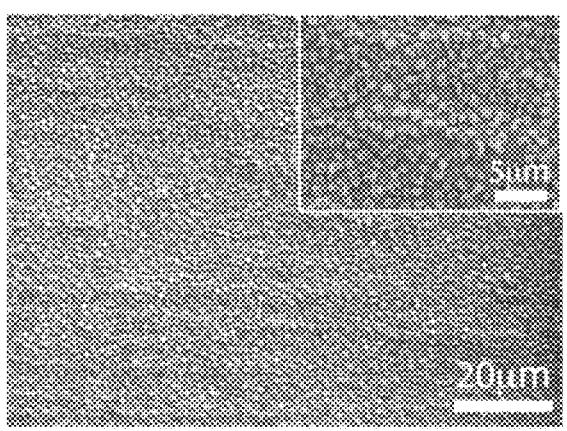

This uniformity in lithium deposition is observed even at the beginning of lithium nucleation. When just a small amount of lithium (about 0.1 mAh/cm$^2$) is deposited, the lithium nuclei on the control electrode are relatively dispersed, forming large particles. On the other hand, lithium nucleation on the electrode modified with the SHP is relatively uniform and evenly distributed (FIGS. 11A-11B). The difference in the initial lithium nucleation phenomenon is potentially due to the modification of the lithium metal with the SHP layer, which slightly reduces the lithium ion mobility adjacent to the lithium surface. The increased deposition overpotential resulting from the impedance of the SHP film produces smaller nuclei with increased areal nuclei density, which ultimately grow to form the highly uniform, dense Li metal.

Figure 4G:
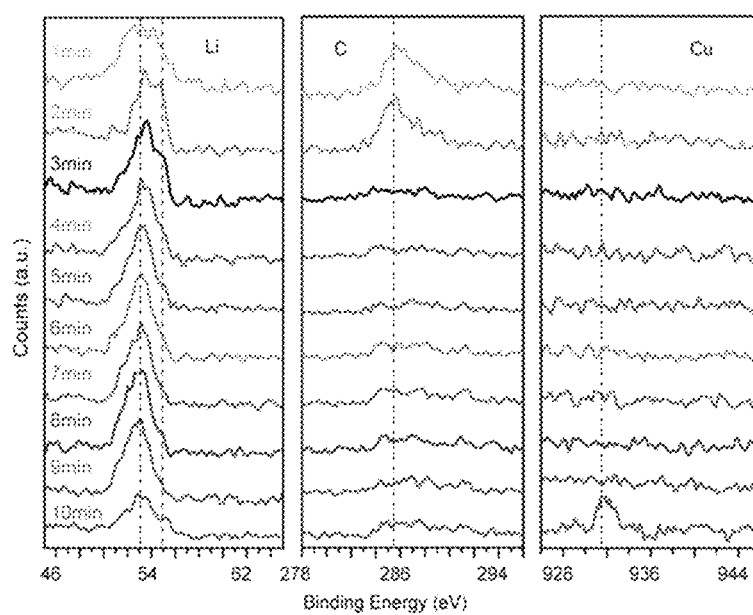

In order to study the spatial distribution of the polymer and lithium metal, X-ray photoelectron spectroscopy (XPS)

is carried out with argon (Ar) ion sputtering on the electrode after lithium deposition. From the spectra (FIG. 4G), it can be observed that the top of the sample shows signal of lithium and carbon. The lithium signal from the top of the electrode shows both Li metal and Li salts (about 53 eV and about 55 eV, respectively), indicating that the SHP forms a hybrid SEI with the Li salts and other normal decomposition products of the electrolyte. The electrode was then sputtered with Ar ion to remove thin layers of the structure. After about 2 minutes of sputtering, the carbon signal is substantially smaller. The lithium signal attributed to lithium salts at about 55 eV also decreases and a lithium metal signal remained. After about 9 minutes of sputtering, copper signal is observed, indicating that substantially all of the SHP and Li has been removed. The slight lithium signal at the bottom of the electrode could be due to the residual lithium metal left behind during sputtering.

Figure 5A:
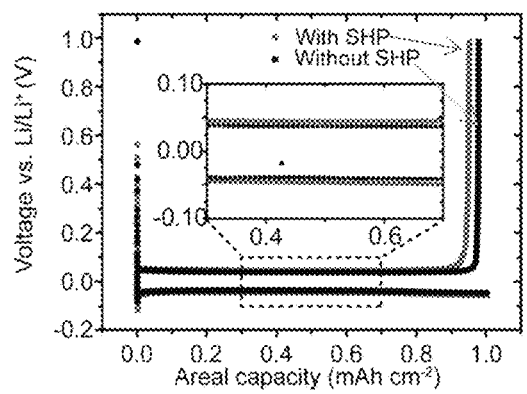
FIGS. 5A-5E. Electrochemical characterization of electrodes.
Figure 5B:
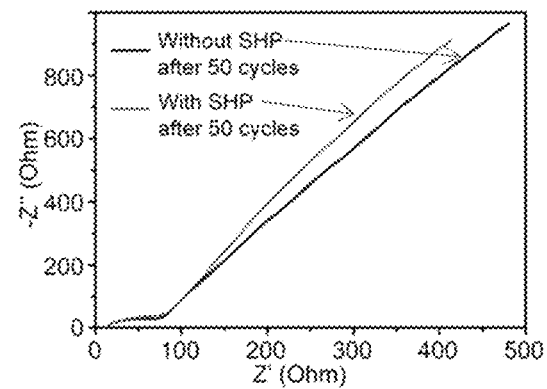
Figure 5C:
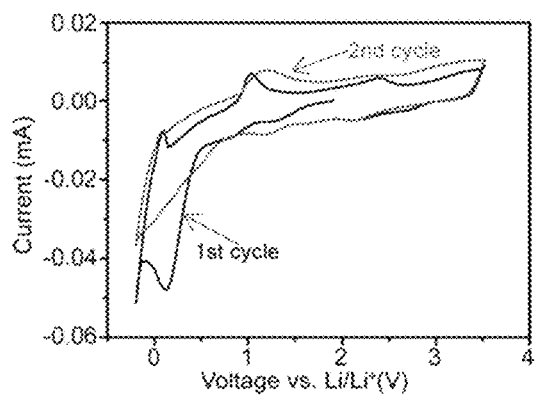
Figure 5D:
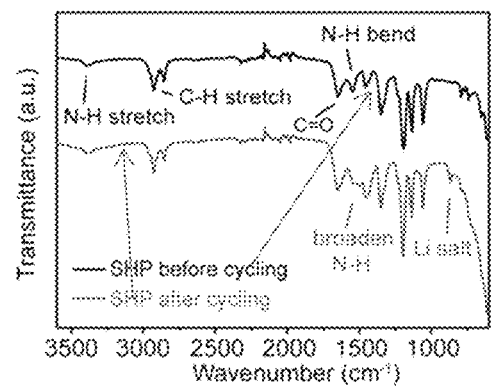
Figure 5E:
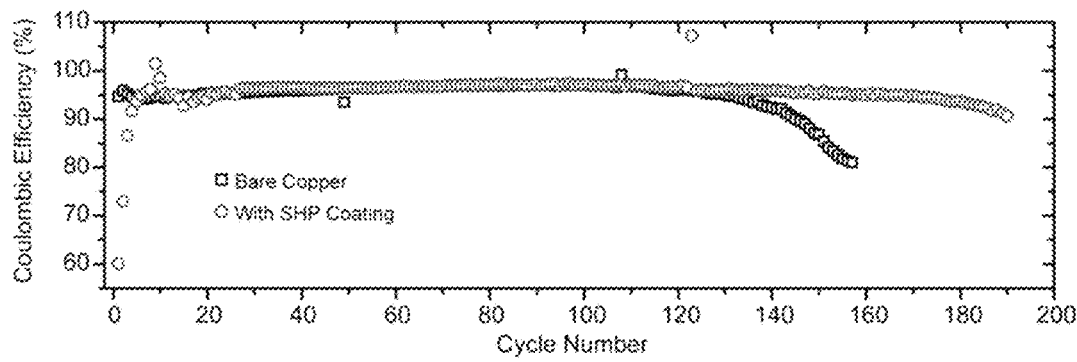
Figure 12A:
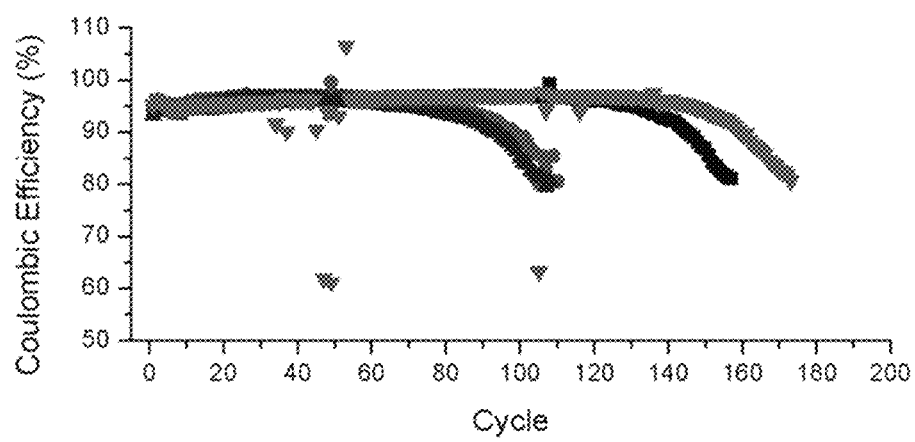
FIGS. 12A-12B. Plots of cycling Coulombic efficiency of (FIG. 12A) bare Cu electrodes and (FIG. 12B) SHP-modified electrodes for each electrode tested, illustrating the consistent performance of the SHP coating.
Figure 12B:
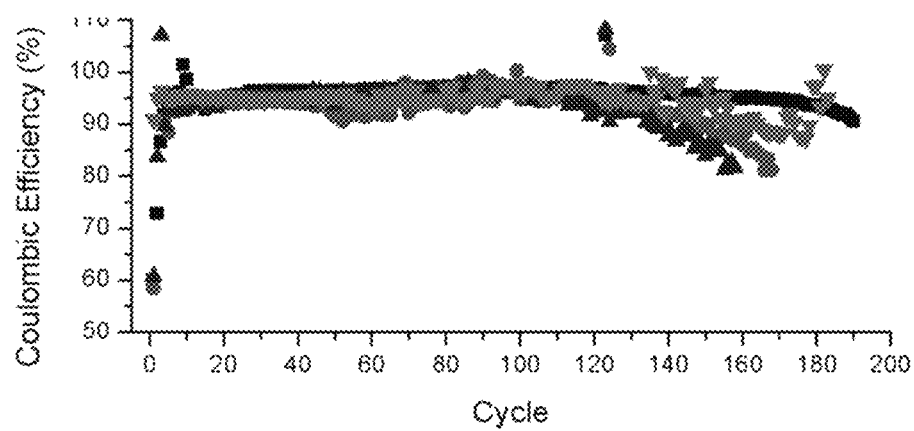

The effect of the self-healing polymer on battery performance is also demonstrated through electrochemical testing. Galvanostatic cycling of lithium deposition/stripping was carried out on electrodes with and without the self-healing polymer coating. The overpotential for lithium deposition and stripping is slightly higher for cells with the SHP than for those without, at about −36 mV and about −20 mV, respectively (FIG. 5A). This is due to the SHP having a lower ionic conductivity in the swollen state than the pure liquid electrolyte. Impedance measurement after 50 cycles also shows similar charge transfer resistance between the two electrodes (FIG. 5B). The stability of the self-healing polymer is demonstrated with cyclic voltammetry and Fourier transform infrared (FTIR) spectra. The cyclic voltammetry analysis shows that slight oxidation/reduction is observed at about 0.1-0.15 V during the first cycle (FIG. 5C). For subsequent cycles, no significant reaction was observed in the voltage window between 0 to about 1 V, which is the voltage range that the lithium deposition/dissolution processes are carried out. The FTIR spectra also confirms that a majority of the functional groups within the SHP are preserved after cycling. There is a slight broadening of the N—H bond, which may be due to the reactions that occurred during the initial cycling or slight interference with the hydrogen bonding structure (FIG. 5D). The cycling performance of the electrode with and without SHP shows significant improvement in the lithium deposition/dissolution with the SHP coating. FIG. 5E shows that with the SHP coating, the CE can be maintained at about 97% for over about 180 cycles at about 1 mA/cm$^2$ current density. The average CE for the control electrode from cycle 20-100 is about 96.4%, which is similar than that of the SHP coated electrodes, but drops below about 90% after about 145 cycles. Consistent performance is observed for all prepared electrodes, showing that the fabrication method is quite robust (FIGS. 12A-12B).

Figure 6A:
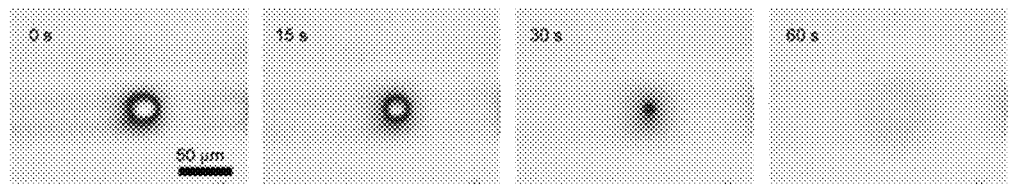
FIGS. 6A-6G. Pinhole free polymer coating.
Figure 6B:
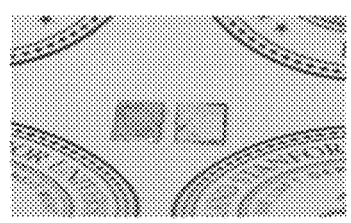
Figure 6C:
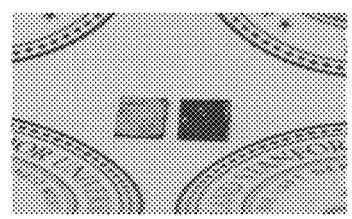

Dendrite Simulation and Pinhole Experiments:

The effectiveness of the SHP in improving the morphology of lithium deposition is related to the conformal coating of polymer on lithium. As a result of the viscoelasticity of the SHP, any pinhole or inhomogeneity in the polymer coating can even out quickly. FIG. 6A shows the healing process of an artificially created pinhole in the self-healing polymer. Within about 1 min, a pinhole with a diameter of about 30 μm self-heals substantially completely at room temperature. The pinhole free polymer coating also provides stability to the lithium metal when in air. When bare lithium metal is exposed to air, rapid reactions between lithium and atmospheric nitrogen, oxygen, and water vapor take place. The surface of the unprotected lithium metal turns black within about 30 mins (FIG. 6C). On the other hand, the SHP allows the lithium metal foil to remain almost unchanged in air (FIGS. 6B, 6C). The pinhole free SHP coating ensures uniform lithium ion flux during deposition and protects the Li surface from emerging hotspots or SEI breakage.

Figure 6D:
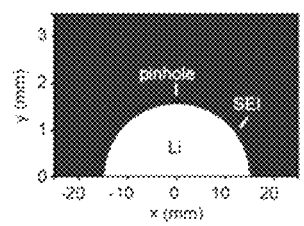
Figure 6E:
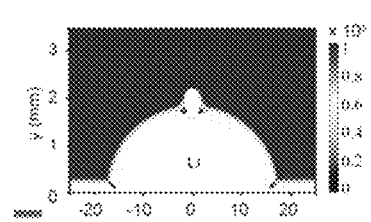
Figure 6F:
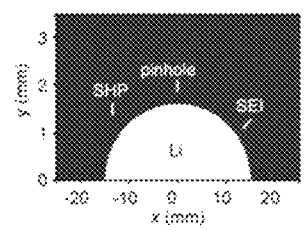
Figure 6G:
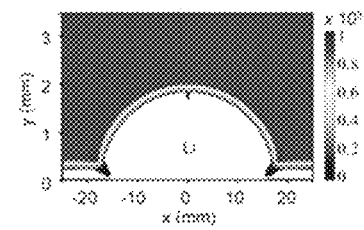
Figure 7:
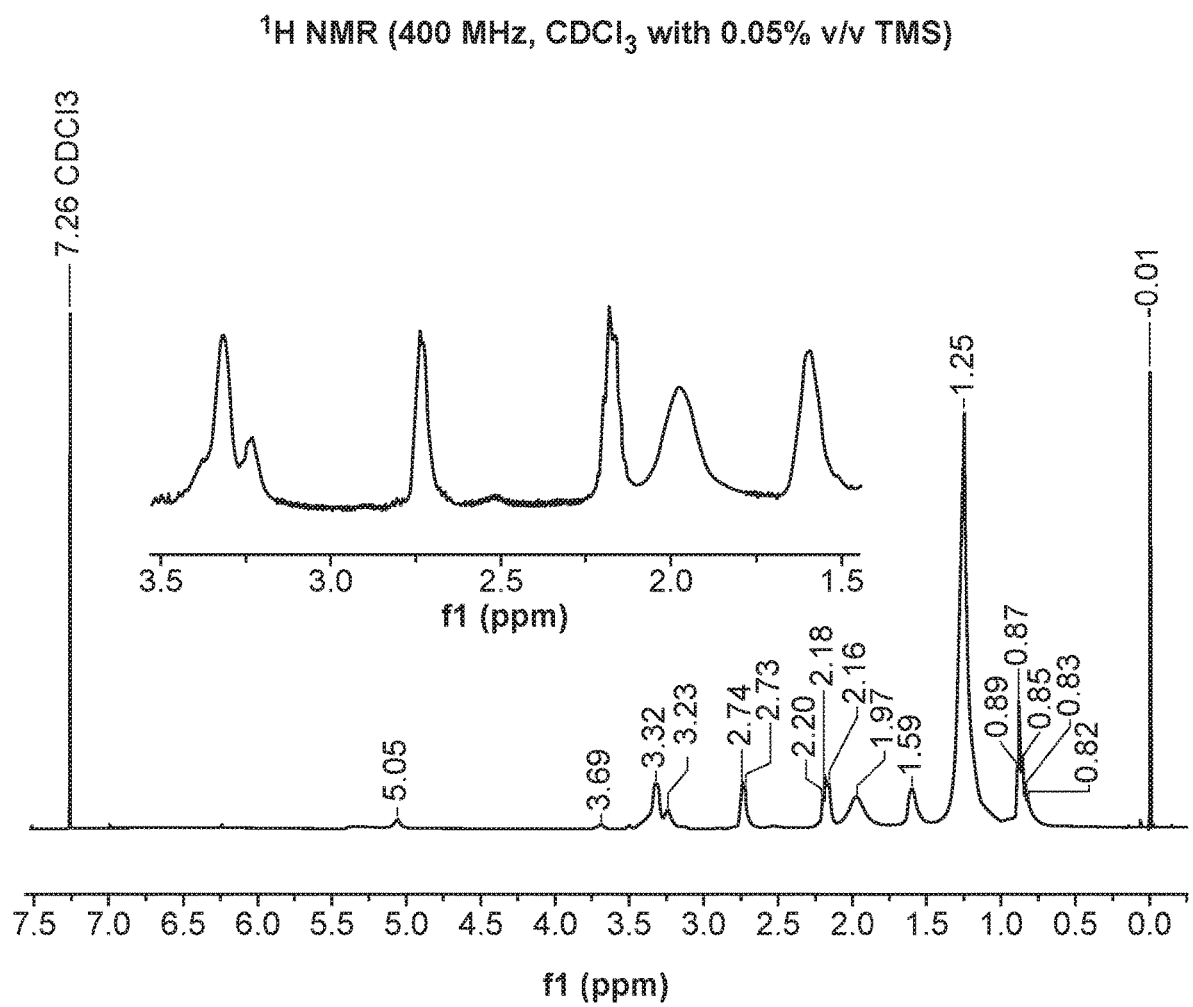
FIG. 7. Nuclear magnetic resonance (NMR) spectra of a self-healing polymer.

This effect is illustrated by the COMSOL simulation, which models the change in lithium deposition morphology with and without the polymer coating. FIGS. 6D and 6E show the case where a defect is created on the SEI of the flat lithium metal. The results show that upon deposition, lithium metal quickly grows from the defect due to the reduction in resistance and subsequent amplified local ionic flux. With the SHP coating, the lithium deposition is still substantially uniform even if there is a defect on the native SEI layer. Additional simulation details are provided in FIGS. 14A-14D. The results demonstrate the advantages of the SHP in maintaining a substantially uniform deposition of lithium metal.

Discussion:

This demonstration of a functional, soft, viscoelastic polymer coating for improving Li metal electrodeposition morphology and electrochemical cycling represents a stark deviation from other understanding. Instead of high modulus coatings or interfaces for suppressing dendrite growth, here it is not mechanical stiffness but rather high softness and intrinsic polymer flow that are utilized to improve electrode uniformity. The strategy of applying a thin protective coating directly to the electrode surface is straightforward and scalable. The self-healing properties of the polymer coating contribute to its robust ability to repair and correct pinholes or hotspots that dynamically arise during battery operation.

Figure 8A:
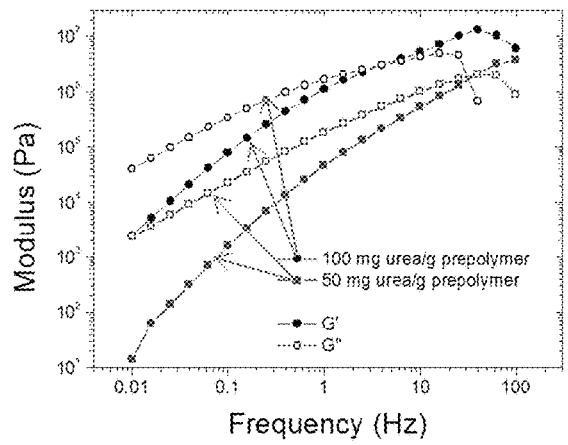
FIGS. 8A-8B. Frequency Sweeps.
Figure 8B:
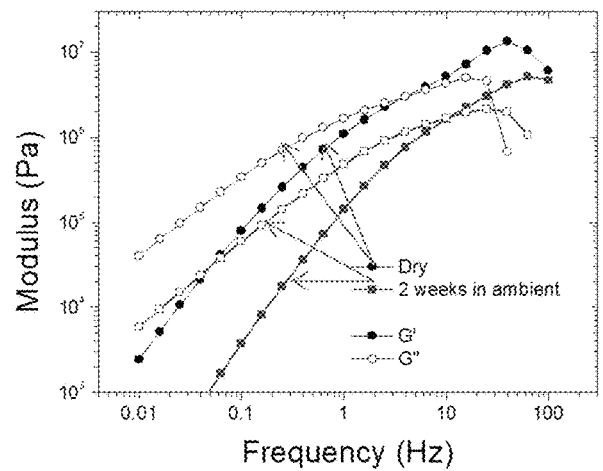

The rheological properties that allow for this self-healing behavior can be sensitive to the amount of urea (and thus hydrogen bonding groups) used in the reaction (FIGS. 8A-8B), but the battery performance is fairly insensitive to these variations in mechanical properties with similar cycling performance and electrochemical properties observed for SHP coatings synthesized with various reactant ratios. This makes the material highly amenable to industrial application by providing a wide processing window in which to operate. However, the absorption of water into the SHP and subsequently the SHP-coated electrodes is a parameter that can affect SHP-modified electrode performance. Due to the large number of hydrogen bonding groups in the polymer structure, the structure is very hygroscopic and absorbs noticeable amounts of water over the course of a few days. This water has a plasticizing effect on the material (FIGS. 8A-8B and 9A-9B), and can lead to reduced electrochemical performance. Compared to the materials that were rigorously dried, the wet SHP samples show reduced cycling lifetimes and reduced Coulombic efficiencies.

In conclusion, this example demonstrates that a self-healing polymer allows the formation of a highly conformal and pinhole free coating on a lithium metal anode. The self-healing and viscoelastic properties of the coating protect the Li electrode from SEI-related hotspots and impart a homogenizing effect on Li ion flux. This example highlights the importance of a uniform surface coating in yielding stable lithium metal anodes that will suppress dendrite formation. With uniform lithium deposition even at high current densities up to about 5 mA/cm$^2$ (or more) and improved electrochemical cycling performance, this example introduces a strategy that runs counter to the notion that high modulus coatings are desired for stable cycling of Li metal electrodes. Furthermore, other types of viscoelastic and supramolecular materials can also be potential candidates for modifying lithium metal to achieve improved cycling performance.

Methods:

Synthesis of Self-Healing Polymer

The design and synthesis of the self-healing polymer is a modified approach from other reports. The amount of urea and reaction time are controlled so that a fraction of amine groups were converted into urea, yielding a polymer that is able to self-heal at room temperature without addition of any plasticizer. First, a mixture of diacid and triacid (Empol 1016, about 41.5 g, donated by Congnis) was mixed with diethylenetriamine (about 17 g) at about 120° C. for about 2 hr and then the temperature was increased to about 160° C. and the reaction proceeded for about 24 h with a substantially constant flow of $N_2$ gas at about 30 mL/min under a water-jacketed condenser. The product was dissolved in about 100 mL of chloroform and washed 3 times with about 75 mL of a methanol and water (about 1:2) solution to remove excess amine. The chloroform and residual water were removed via rotary evaporation at about 40° C. and then about 80° C. to obtain a randomly branched oligomer terminated with amine groups (M-$NH_2$). About 10 g of M-$NH_2$ was reacted with about 1 g of urea for about 4 hr at about 135° C. under substantially constant flow of dry air (about 50 mL/min) to obtain the self-healing polymer (SHP). The reaction mixture was stirred using a Trubore stirrer assembly (Ace Glass) to maintain a controlled atmosphere inside the reaction vessel. The polymer was then baked overnight at about 80° C. under vacuum to remove trapped gas bubbles and water. Finally, the SHP was dissolved in about 1:1 chloroform and ethanol solution at a concentration of about 250 mg/mL for spin coating. Solutions were passed through a 0.45 μm polytetrafluoroethylene (PTFE) filter to remove any particulates before coating.

Electrochemical Testing

Electrochemical properties of the lithium metal anodes were tested in 2032 coin cells with a 96-channel battery tester (Arbin Instruments). The working electrodes were composed of either a bare Cu current collector or a Cu foil disc coated with the designed SHP. The counter electrode was Li metal foil (about 750 μm thick, Alfa Aesar) punched into a disc with area of about 0.5 $cm^2$. The electrolyte was about 1 M lithium bis(trifluoromethanesulphonyl)imide (LiTFSI) in 1,3-dioxolane and 1,2-dimethoxyethane (volume ratio of about 1:1) with about 1 wt. % lithium nitrate ($LiNO_3$). A commercially available polymer separator (Celgard 2250) was used between the two electrodes. About 75 μL of electrolyte was added to each cell to standardize the tests. The Coulombic efficiency measurement was carried out by depositing a fixed amount of lithium onto the working electrode followed by stripping to about 1 V. Cycling tests were carried out by first depositing a fixed amount of Li onto the electrode, followed by Li stripping up to about 1 V. Coulombic efficiency is calculated by dividing the amount of lithium stripped over the amount of lithium deposited during each cycle. Cycling tests were initialized by cycling the electrodes between 0 to about 1 V for 10 cycles. Electrochemical impedance spectroscopy measurements were taken over a frequency range of about 200 mHz to about 1 MHz. Impedance and cyclic voltammetry measurements were taken using a potentiostat (Biologic).

Characterization

Nuclear magnetic resonance (NMR) (1H) spectra were recorded on a Varian Mercury 400 MHz NMR spectrometer at room temperature. Fourier transform infrared (FTIR) spectra were measured using a Nicolet iS50 FT/IR Spectrometer (Thermo Fisher) with a diamond attenuated total reflectance (ATR) attachment. Rheological experiments were carried out using an Ares G2 Rheometer (TA Instruments) with an advanced peltier system (APS) at about 25° C. as the bottom geometry and an about 25 mm parallel plate as the top geometry. The gap height was about 1 mm. Frequency sweeps were carried out from about 0.1 to about 100 Hz at about 1% strain and stress relaxation experiments were performed at about 1% strain. Differential scanning calorimetry (DSC) experiments were performed using a DSC-Q2000 (TA Instruments) over a temperature range of about −70° C. to about 150° C. with a ramp rate of about 10° C./min. $T_g$ data was taken from the second heating cycle. X-ray photoelectron spectroscopy (XPS) measurements were taken with a PHI 5000VersaProbe system with an Al Kα radiation (about 1486 eV) source. A FEI XL30 Sirion SEM with FEG source was used for scanning electron microscope (SEM) characterizations.

COMSOL Simulation

The COMSOL Tertiary Nernst-Planck Electrodeposition module with deforming geometry was used to simulate the effects of a SHP coating over a pinhole on a Li surface. The ionic current distribution and the Li metal surface geometry change were simulated as Li deposition was carried out on the bare and SHP-modified electrode surfaces. Further simulation parameters and details can be found in FIGS. 14A-14D.

Monte-Carlo Simulation

A coarse-grain two-dimensional kinetic Monte Carlo simulation is developed using MATLAB to illustrate the growth dynamics for differing values of electrolyte conductivity. The simulation is based on a model in which ions move along small displacement steps calculated by superposing the root mean square (rms) diffusive displacement and drift displacement vectors described as: $\{\Delta r\}=(2RT\sigma\Delta t/F\rho)^{1/2}g+(\sigma\Delta t/\rho) E$. The direction of the diffusive displacement unit vector g is chosen by a pseudo-random number generator that assigns a new random direction to every ion at every time step; the electric field vector is determined by the geometry of the anode surface. For any given ion in the computational cell, motion continues until it comes into contact with the anode (thus depositing by freezing in place), or another ion that has already deposited. The following parameters are chosen: T=300 K, ρ=1000·F (corresponding to a $Li^+$ molarity of 1 M), and Δt=100 ns. The electrolyte has a uniform conductivity σ, which can be adjusted as desired.

For computational efficiency, the size of the computational cell is chosen to be 12.5 nm "tall" in the z-direction from electrode to depletion zone boundary, by 17.5 nm "wide" (and periodic) in the x-direction along the electrode surface. The overpotential on the anode is adjusted to V=−0.5 mV, which when divided by the cell height $w_d$=12.5 nm gives approximately the same electric field that would result from the more realistic values of V=−50 mV and $w_d$=1 μm. Ten free lithium ions are in the simulation cell at all times and the simulation runs until a total of 1000 atoms enter the cell.

The simulation is performed for six decreasing values of conductivity running across the intersection point of 2 μS/cm derived above: 5 μS/cm, 4 μS/cm, 3 μS/cm, 2 μS/cm, 1 μS/cm, and 0.5 μS/cm. To account for statistical fluctuations introduced by the pseudo-random position seeding and diffusion directions, three simulations are performed for each value of ionic conductivity. The deposition behavior changes as a function of the ionic conductivity: as conductivity falls, the initial deposition along the anode surface becomes more homogeneous. This conforms to the hypothesis that a higher conductivity causes drift to dominate over diffusion, thereby exerting a stronger pull on ions towards dendrite tips. Meanwhile, in the lower conductivity simulations, ions are more likely to diffuse away from existing dendrite nuclei. These differences are most pronounced in the lower 20% of the computational cell before runaway growth kicks in, namely up to 2.5 nm off the anode.

Figure 13A:
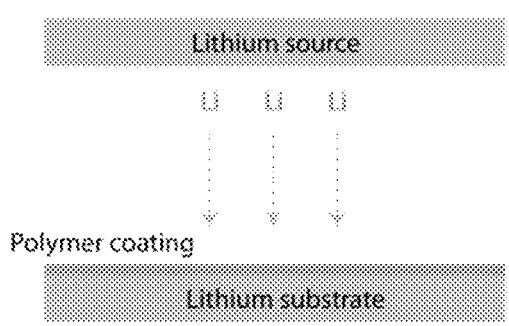
FIGS. 13A-13D. Monte-Carlo simulation of lithium deposition at an electrode with different conductivities.
Figure 13B:
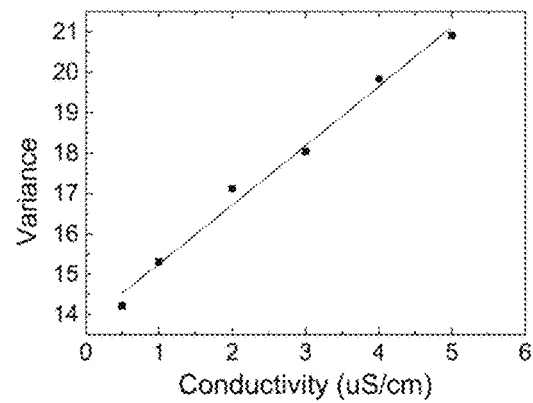
Figure 13C:
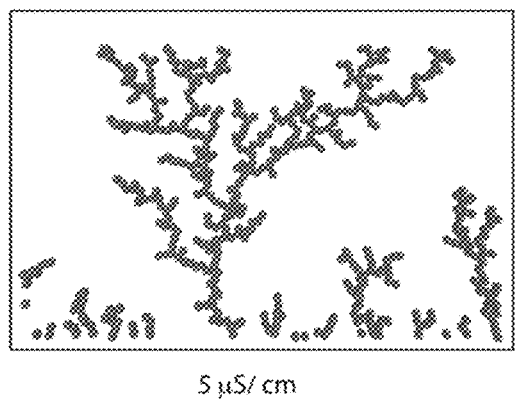
Figure 13D:
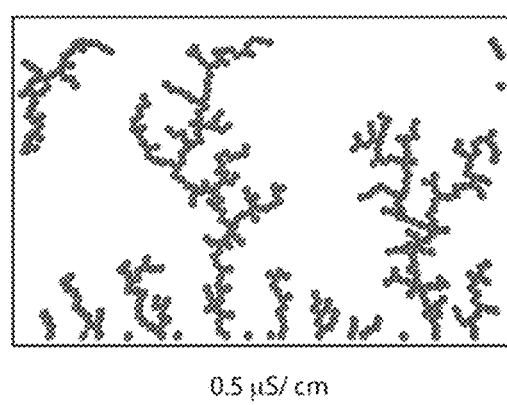
Figure 14A:
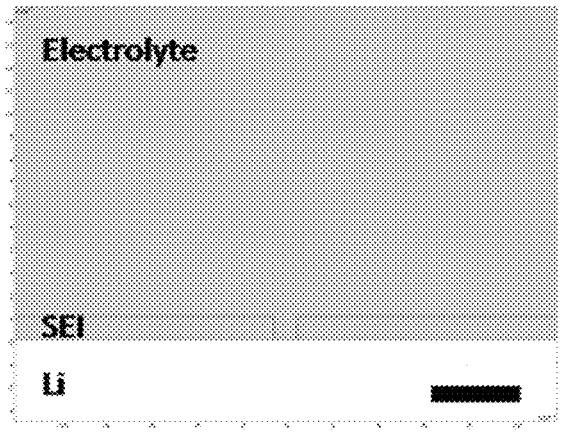
FIGS. 14A-14D. A magnified simulation cell geometry in COMSOL for (FIG. 14A) a control electrode with no SHP coating and (FIG. 14B) an electrode with a 1 µm thick SHP coating. A 100 nm thick solid electrolyte interphase (SEI) layer is formed on the planar Li surface, and a 100 nm pinhole representing cracking or breaking of the SEI is present in the SEI layer. This pinhole is filled with electrolyte in the case with no SHP, while the pinhole is filled with SHP in the case with the SHP coating, reflecting the viscoelastic flowability of the SHP coating. The entire simulation cell geometry for (FIG. 14C) the control electrode and (FIG. 14D) the SHP-coated electrode has a 50 µm thick inter-electrode spacing filled with electrolyte, representing the thickness of the electrolyte-impregnated separator. The overpotential of deposition was set to −500 mV vs Li/Li$^+$ at the working electrode. The diffusion coefficient of Li$^+$ was set to $1\times10^{-5}$ cm$^2$/s. The electrodeposition module in COMSOL uses the Einstein relation ($D=\mu k_b T/q$) to calculate the ionic mobility, µ, and the diffusion coefficient chosen closely matches values calculated from experimental electrolyte conductivities. The diffusion coefficient of Li$^+$ in the SEI was set to $1\times10^{-9}$ cm$^2$/s and the diffusion coefficient of Li$^+$ in the SHP was $5\times10^{-10}$ cm$^2$/s, reflecting a reduction of 10,000 and 20,000 times conductivity compared to the bulk electrolyte, respectively.
Figure 14B:
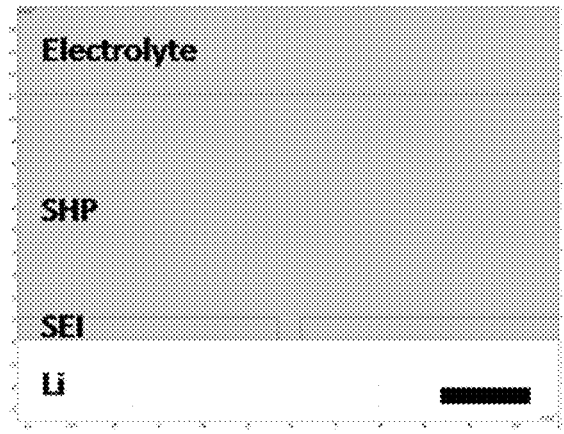
Figure 14C:
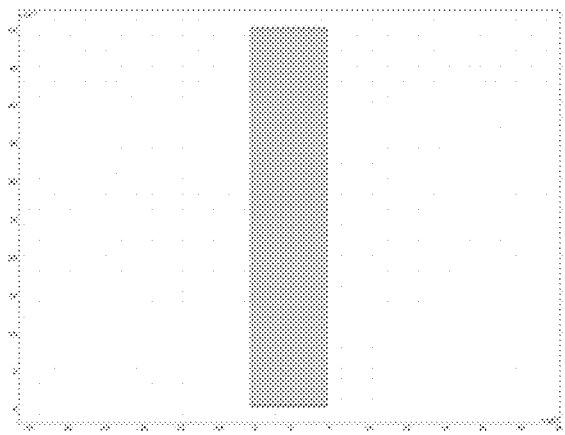
Figure 14D:
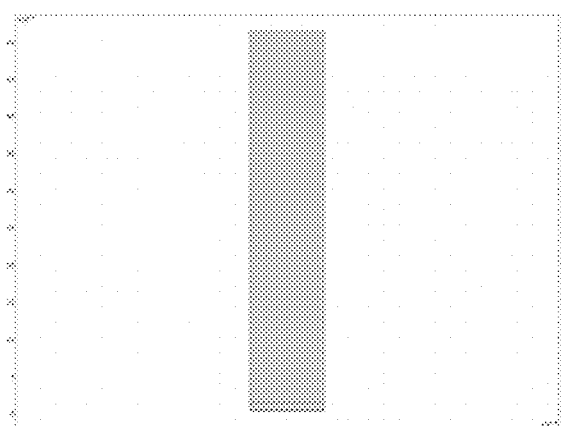

To quantify this effect, the lower 2.5 nm of the computational cell is divided into vertical bins along the x-axis and the number of deposited ions that fall within each bin is counted. This generates a histogram showing the distribution of deposited ions near the anode surface. The variance in bin height for each histogram is calculated to quantify the homogeneousness of the distribution. These variances are averaged over three runs for each conductivity value, and plotted in FIG. 13B to show that decreasing the electrolyte conductivity decreases the variance of the deposition. This demonstrates that, when considering solely the competing factors of diffusion and drift in a mean field model, decreasing the ionic conductivity alone will result in more uniform $Li^+$ deposition. This provides a theoretical understanding for the effect of the SHP coating.

Example 2

Self-Healing Polymer for Lithium Metal Anodes

Overview:

The prospect of low cost, high performance electrical vehicles lies in the development of next-generation energy storage systems. Current battery technologies are challenged because their energy density is too low and their cost is too high. High energy density batteries such as Li—S and Li-Air have the potential of increasing the energy density by about 5-10 times at low cost. Li metal anode is an important component to allow the successful applications of these new battery technologies. However, Li metal has significant material challenges including dendrite formation and low cycling efficiency. In this example, a general concept is proposed to stabilize the interface of lithium metal anode using self-healing polymers, which can repair surface damages resulted from the large volumetric expansion of lithium deposition process.

Figure 15A:
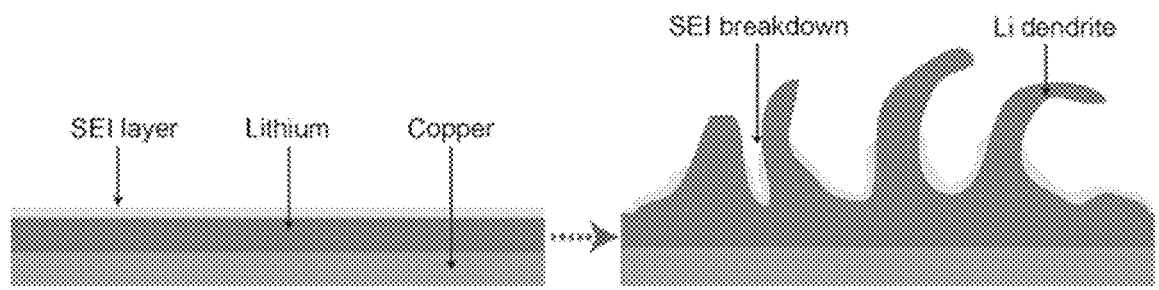
FIGS. 15A-15B. Schematic diagrams of lithium deposition.

Proposed Concept:

The problems of dendritic and mossy Li formation cause poor safety and low Coulombic efficiency during charge/discharge of a lithium metal anode. A stable interface is desired for ensuring uniform lithium deposition. A solid electrolyte interphase (SEI) on the surface of lithium metal provides lithium ion conducting pathways for lithium metal deposition. However, the composition of the SEI layer is highly non-uniform and brittle as it is composed of a mixture of organic and inorganic compounds. The variation in local current density and large volumetric change of lithium deposition results in cracking of the SEI layer and subsequent dendrites growth (FIG. 15A).

Figure 15B:
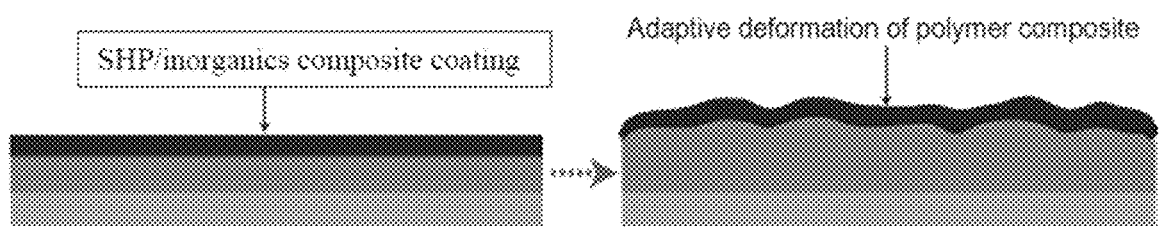

For batteries to achieve reasonable charging capabilities, high current densities of about 3 $mA/cm^2$ and above are desired. Such high current cycling can put more strain on the interfacial stability of the lithium metal anode. Mitigating against the cracking of the SEI layer demands more innovative approaches. This example proposes the use of a composite material with a self-healing polymer (SHP) and inorganic nanostructures to protect the lithium surface and stabilize the SEI layer (FIG. 15B). The concept here is to achieve a uniform, substantially pinhole-free coating on the lithium metal anode. At the same time, the surface coating should be flexible and adaptable to the large volumetric change during lithium metal cycling. The SHP proposed in this example is a hydrogen-bonding-directed supramolecular polymer with a low glass transition temperature. Hydrogen bonds have the ability to associate and disassociate reversibly at room temperature. Therefore, upon mechanical stress, the hydrogen bonds will break first to protect the covalent bonds. Once the damaged locations are brought together again, the broken hydrogen bonds will reform, driving the polymer chains to diffuse through the interface, leading to a self-healing event. Furthermore, by controlling the density of hydrogen bonds, the mechanical strength, viscoelasticity, healing speed and stretchability of the polymers can be tuned. This example proposes to use a SHP with a relatively high percentage of hydrogen bonds. In this way, the polymer will have a lower mechanical strength but it will be highly stretchable and viscoelastic. By controlling the chemical structures and adding inorganic nanostructure fillers, the resulting composite can be further tuned for sufficient mechanical strength and ion conductivity. A thin layer of the SHP can be coated on top of a lithium metal electrode to serve as a flexible and adaptive surface layer. In addition, the reversible hydrogen bonding allows repair of the polymer after damage by mechanical stress. These self-healing and flow properties will allow the SEI layer to have more uniform lithium ion conduction and reduce the formation of "hot spots" where lithium ion flux is dramatically increased due to pinholes in the SEI.

Results have shown significant improvement in lithium deposition morphology when applying the polymer on the lithium metal anode. In addition, it is demonstrated that organic or inorganic surface coating such as amorphous carbon, boron nitride and graphene could afford interfacial protection of lithium metal due to their chemical stability, mechanical strength and flexibility. It is proposed that the combination of the viscoelastic SHP and stable nanostructured materials could further enhance the surface coating and allow lithium metal cycling at higher current density for longer cycle life.

Figure 16:
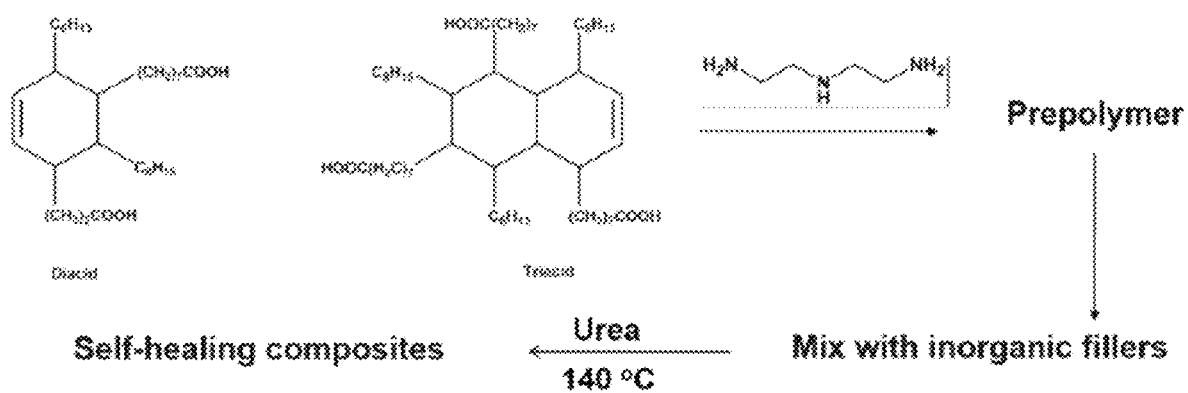
FIG. 16. Synthesis route for a SHP/inorganic composite.

Synthesis of Self-Healing Composites and Tuning of Polymer Structure:

In order to achieve high stability for the lithium metal anode, it is proposed to tune the mechanical properties and ion transport in the polymer films using polymer composites with inorganic fillers. The mechanical strength of the SHP may be generally weak, and the addition of inorganic fillers can effectively increase the mechanical strength of the polymer materials. Mixing of inorganic nanostructured materials may change the self-healing properties of the polymer. Several inorganic nanostructured fillers can be evaluated in order to obtain desired composites. Possible choices of inorganic fillers can include graphene oxide nanosheets, metal oxide nanoparticles, $SiO_2$ nanoparticles, boron nitride nanosheets, and so forth. These fillers can increase the ionic conductivities of the composites and enhance the mechanical modulus. High-modulus materials can further suppress dendrite growth and further improve the performance of a battery. It is proposed to form these polymer composites by in-situ polymerization (FIG. 16). First, a prepolymer can be mixed with inorganic fillers. The mixture can then be treated with urea to solidify into SHP composites. By controlling the amount of inorganic fillers and reaction time, the mechanical properties and ionic conductivities can be tuned. Then the performances of different composites can be evaluated to identify desired compositions.

Figure 17A:
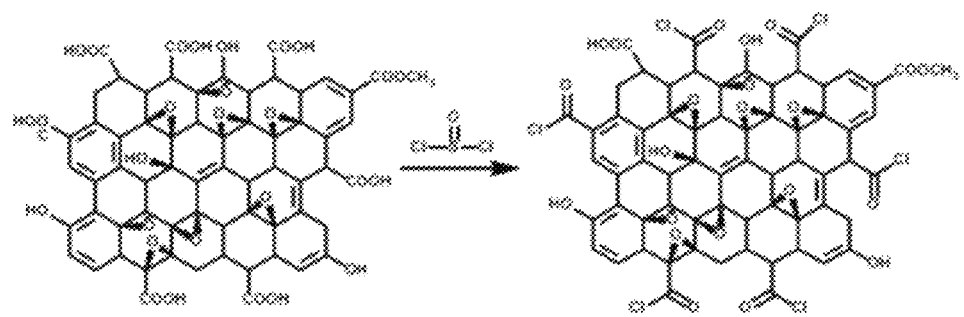
FIGS. 17A-17B.
Figure 17B:
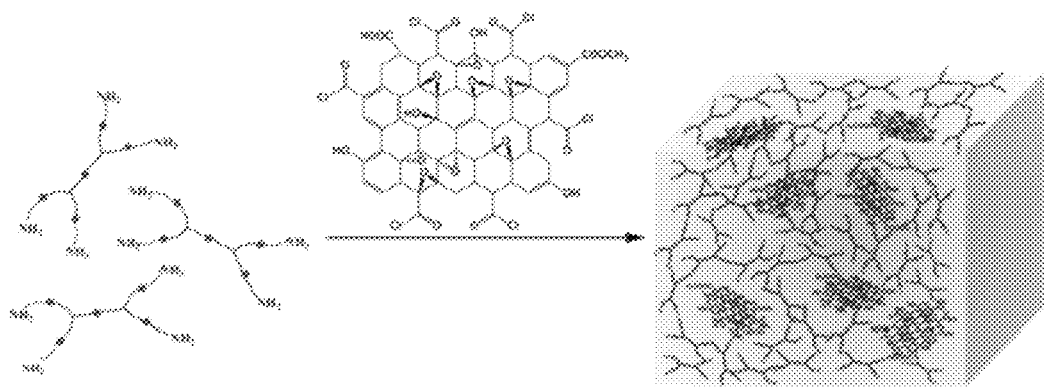

The inorganic fillers can also be linked to the polymers by chemical bonds. Examples of inorganic fillers include: clay plates or sheets, various oxide particles and plates or sheets, nanodiamond, layered inorganic materials, graphene, and graphene oxide. For example, graphene oxide is of particular interest because of its high mechanical strength and ready chemical modification. It is proposed to use graphene oxide as a macro cross-linker for self-healing materials to further enhance the mechanical properties of the polymer materials. Firstly, graphene oxide can be chemically modified with functional groups, such as carbonyl groups (FIG. 17A). The chemically modified graphene oxide is then reacted with amine-terminated prepolymer into a self-healing composite (FIG. 17B). Due to the ultra-high strength of graphene oxide and chemical bonding with the polymers, a small amount of graphene oxide can greatly enhance the mechanical properties, without decreasing the self-healing capability and mechanical stretchability. Composites can be synthesized with different amounts of graphene oxide, and their battery performances can be evaluated. The process described here can use chemical processes that are readily scalable.

Figure 18A:
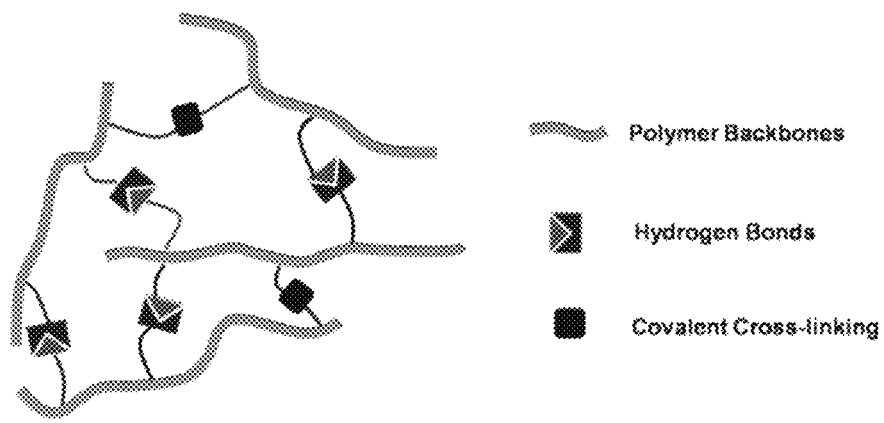
FIGS. 18A-18D.
Figure 18B:
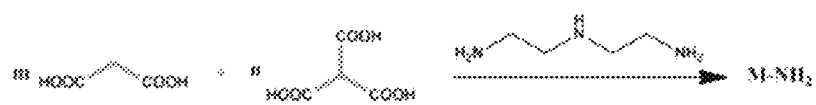

To further control the mechanical and ion transport properties of the polymer composites, the molecular structure of the SHP also can be tuned. FIG. 18A shows the design of the hydrogen bonding in the SHP. It is composed of a polymer backbone, hydrogen bonding sites and covalent cross-linking sites (also can be inorganic filler as described above). The polymer backbone holds the main frame of the polymer and provides functional sites for functionalization of hydrogen bonding groups and other covalent cross-linking sites. The hydrogen bonding provides the polymer with self-healing capability. The covalent cross-linking sites (also can be inorganic fillers) are used to further tune the mechanical properties of the polymer. By controlling the polymer molecular structure, SHPs with varying mechanical strengths and self-healing properties can be attained.

Figure 18C:
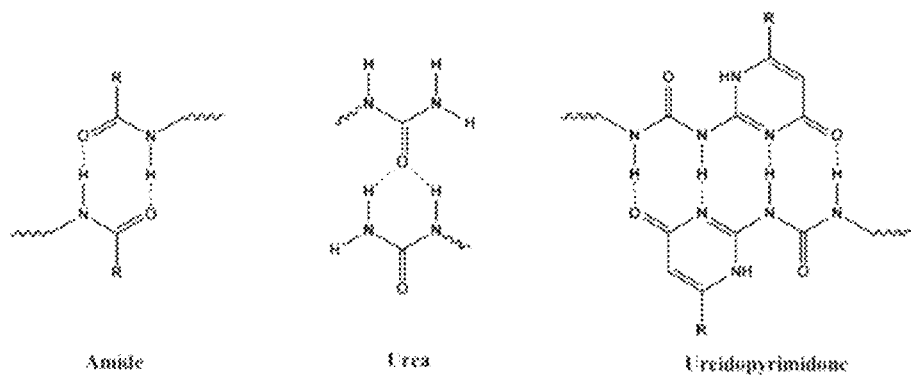
Figure 18D:
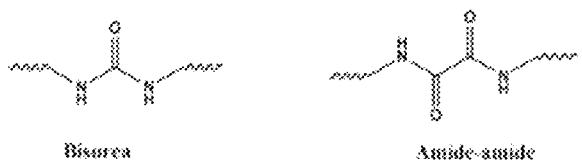

The self-healing process is driven by the association and dissociation of hydrogen bonds. The bonding strength and density of hydrogen bonds can directly influence the mechanical properties and healing capability of the polymers. The hydrogen bonding strength can vary significantly among different functional groups (FIG. 18C). Amide is an example of a hydrogen bonding site and has a relatively weak bonding strength (about 5 kJ/mol). The bonding strength of urea is stronger at about 20 kJ/mol. Ureidopyrimidone, on the other hand, is one of the strongest hydrogen bonds (about 50 kJ/mol). Depending on the inorganic filler modifications, if additional adjustment of the mechanical properties is desired, polymers with hydrogen bonding sites of different bonding strength and density can be evaluated so as to investigate their impact on the resulting battery performance.

Characterization of Modified Self-Healing Polymers and Polymer Composites:

A library of SHPs and composites can be synthesized with different chemical functionalities, and can be characterized so as to correlate the materials properties with the performance of the polymers and composites in Li metal anodes.

Glass transition temperature ($T_g$) can be measured using differential scanning calorimetry (DSC). $T_g$ can also be confirmed using a complementary dynamic mechanical analysis (DMA) technique. In order to ensure quick stress relaxation, and thus good adaptability, of the polymer coatings at normal operating conditions, $T_g$ of the materials can be tuned to be well below room temperature. This low $T_g$ will also allow self-healing of these materials at room temperature by allowing the polymer chains to move within the solid and reform broken hydrogen bonds in the materials. This self-healing can be evaluated using stress-strain testing. The toughness and modulus of a pristine material can be measured and used as a baseline to evaluate the healing efficiency for each material. Healed samples can be cut completely in half before being rejoined and allowed to rest for a specified amount of time. After this healing time, the samples can be strained under the same conditions as the pristine material, and the modulus and toughness can be compared.

Additionally, the rheological properties of these materials can be examined using a rheometer and DMA. Frequency sweeps, stress relaxation, and creep experiments can be used to examine viscoelastic behavior of the polymers and composites. Using this information, a characteristic relaxation time can be obtained for each material. This will allow for quantification of the flowability of these materials. By examining materials with a broad range of flow properties, trends and criteria for the viscoelasticity of the materials can be identified to mitigate against dendrite formation and growth.

Scalability:

A SHP can be melt processed at relatively low temperatures (e.g., about 60-120° C.). The SHP can also be solution processed in a variety of organic solvents. Additionally, the SHP motif offers a wide range of tunability in viscosity by changing reactant ratios, without significant changes in performance. This will allow for optimization for high throughput coating processes. The starting materials can be inexpensive and commercially available. A two-step reaction to synthesize the materials can be done at moderate temperatures (e.g., about 160° C.) and large scale (e.g., about 50 g). Furthermore, the second step of this reaction can be performed in open air. This insensitivity of the chemistry to water and air can allow for straightforward industrial scale synthesis.

Example 3

Self-Healing Polymers for Lithium Metal Anodes

Introduction:

To allow the mass adoption of electric vehicles, two challenges of battery technology should be addressed: increasing the energy density and reducing the cost. The lithium-ion battery (LIB) is the most promising energy storage candidate to power these electrical vehicles. Although current lithium-ion batteries have been very successful for portable electronic devices, these batteries have not yet met the criteria for ubiquitous utilization in electrical vehicles. A typical LIB is based on the combination of a carbon anode and a lithium metal oxide or phosphate cathode (e.g., $LiCoO_2$, $LiMn_2O_4$, and $LiFePO_4$). The relatively low capacities of these electrodes (about 370 mAh/g for graphite and about 140-170 mAh/g for lithium metal oxides or phosphates) constrain the total specific energy of the battery. To address mass market electric vehicle applications, much higher specific energy/energy density (e.g., about 3-5 times) is desired. Improving the energy density of LIBs involves exploiting improved materials for battery anodes and cathodes, such as silicon and sulfur. Specifically, if silicon is used to replace graphite anodes, the theoretical specific charge capacity is about ten times higher. However, these materials experience extreme expansion and contraction during the lithiation and delithiation processes. These volumetric changes lead to rapid morphology deterioration of the electrode materials (cracks, electrical isolation or particles, pulverization, and so forth), which dramatically reduces the battery lifetime to a few charge-discharge cycles. Tremendous efforts have been made to address these material challenges by nanosizing the active materials, including nanoparticles, nanowires, porous structures, nanotubes, hollow particles, yolk-shell particles, thin films and composite nanostructures. However, the improvement of the materials is still not enough to satisfy criteria for electrical vehicles. Furthermore, the use of nanostructured materials makes it more challenging to achieve robust electronic connections between nanostructures. Also, many nanostructures generally involve complex and expensive synthesis and fabrication processes. Therefore, cost and cycling stability remain significant barriers for alternative high energy density LIB materials applied in transportation applications.

Micron-sized Si particles (Si-mPs) are promising for industrial applications due to their low cost for mass production. However, cracks and pulverization are formed due to the large volumetric changes during the cycling process, leading to extremely short cycling lifetime. Si-mP anodes, for example, can quickly lose about 80% of their initial capacity in less than 10 cycles.

In addition to LIBs, high energy density batteries such as Li—S and Li-Air have the potential of increasing the energy density by about 5-10 times at low cost. Li metal anode is a n important component to allow the successful applications of these emerging battery technologies. Li metal has the highest specific capacity of about 3860 mAh/g of Li and the lowest potential for maximizing the cell voltage. Pairing Li metal anode with low cost sulfur cathodes can produce batteries with about 6 times the theoretical specific energy of the current technology (about 3 times potentially practically achievable). Pairing Li metal anode with air cathode can potentially produce even higher energy density. However, the problems of dendritic and mossy Li formation cause poor safety and low Coulombic efficiency during charge/discharge. A stable interface is desired in ensuring uniform lithium deposition. A solid electrolyte interphase (SEI) on the surface of lithium metal provides lithium ion conducting pathways for lithium metal deposition. However, the composition of the SEI layer is highly non-uniform and brittle as it is composed of a mixture of organic and inorganic compounds. The variation in local current density and large volumetric change of lithium deposition result in cracking of the SEI layer and subsequent dendrites growth.

In this example, an approach is proposed to use self-healing polymers (SHPs) to allow high capacity and highly stable Li metal anodes.

Li Metal Anode Protected by Self-Healing Polymer:

For batteries to achieve reasonable charging capabilities, high current densities of about 3 mA/cm² and above are desired. Such high current cycling can put more strain on the interfacial stability of the lithium metal anode. Mitigating against the cracking of the SEI layer demands a more innovative approach. This example proposes the use of a SHP to protect the lithium surface and stabilize the SEI layer. The SHP is highly stretchable, flowable due to its low glass transition temperature and can be conformably coated on the lithium metal surface. In addition, the reversible hydrogen bonding allows repair of the polymer after being damaged by mechanical stress. The self-healing and flowable properties allow the SEI layer to have more uniform lithium ion conduction and reduce the creation of "hot spots" where lithium ion flux is dramatically increased due to the formation of pinholes.

Figure 19A:
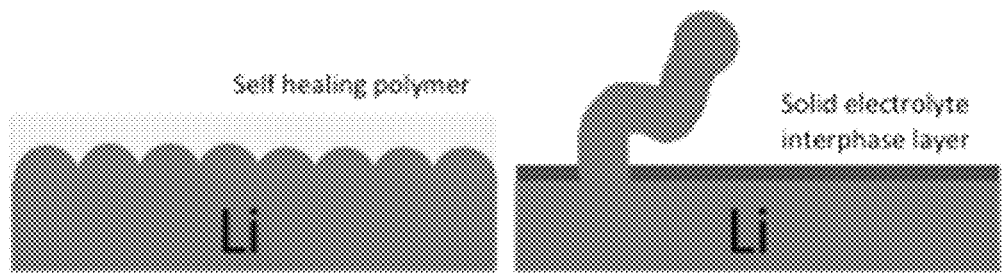
FIGS. 19A-19D.
Figure 19B:
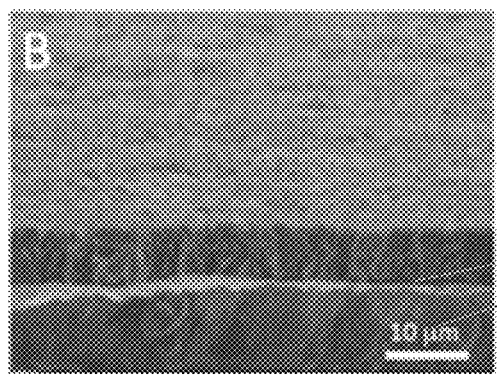
Figure 19C:
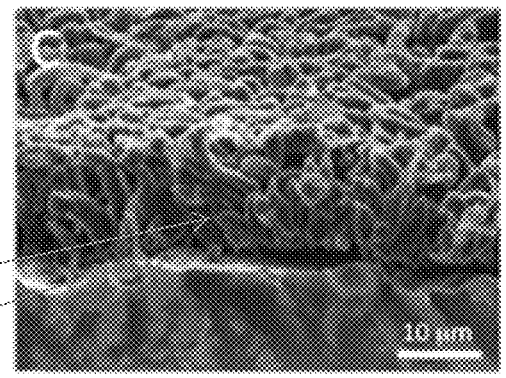
Figure 19D:
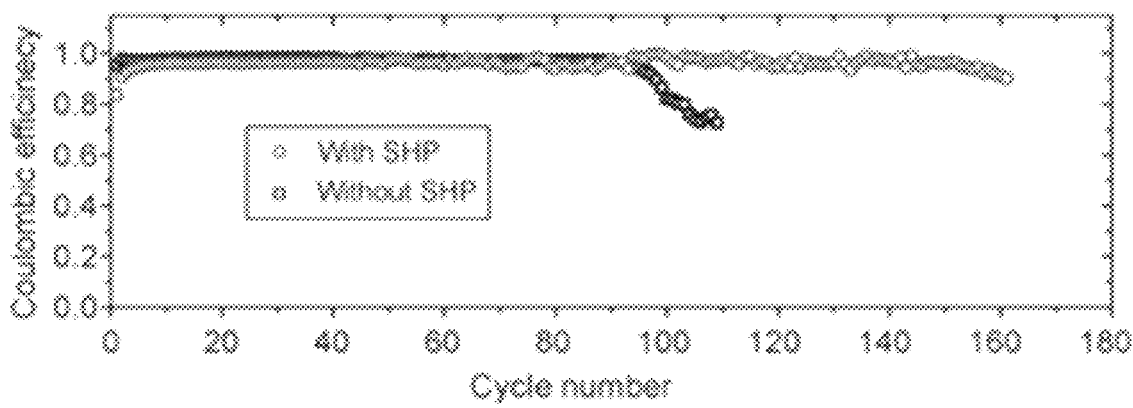

When applying the SHP to the lithium surface, dramatic improvement in the lithium metal deposition morphology is observed (FIG. 19A). For the surface modification, the polymer was coated onto a copper current collector using a razor blade. The modified copper current collector was then assembled in a coin cell with lithium metal as both the reference and counter electrodes. Galvanostatic cycling of lithium deposition/dissolution was carried out at different current densities. FIGS. 19B-19C show that the morphology of the lithium deposits with the SHP is highly dense and uniform. This is in contrast to the control sample, where the deposited lithium showed a highly mossy and dendritic structure. For the same amount of lithium deposited (about 1 mAh/cm²), the control electrode has a much thicker lithium layer due to the highly porous nature of the dendritic structures. On the other hand, the polymer-modified electrode has a thickness of about 5.1 which is close to the theoretical thickness of about 5 The dense lithium deposition results in improved cycling Coulombic efficiency of the polymer-modified electrode for over about 150 cycles (FIG. 19D).

Figure 20A:
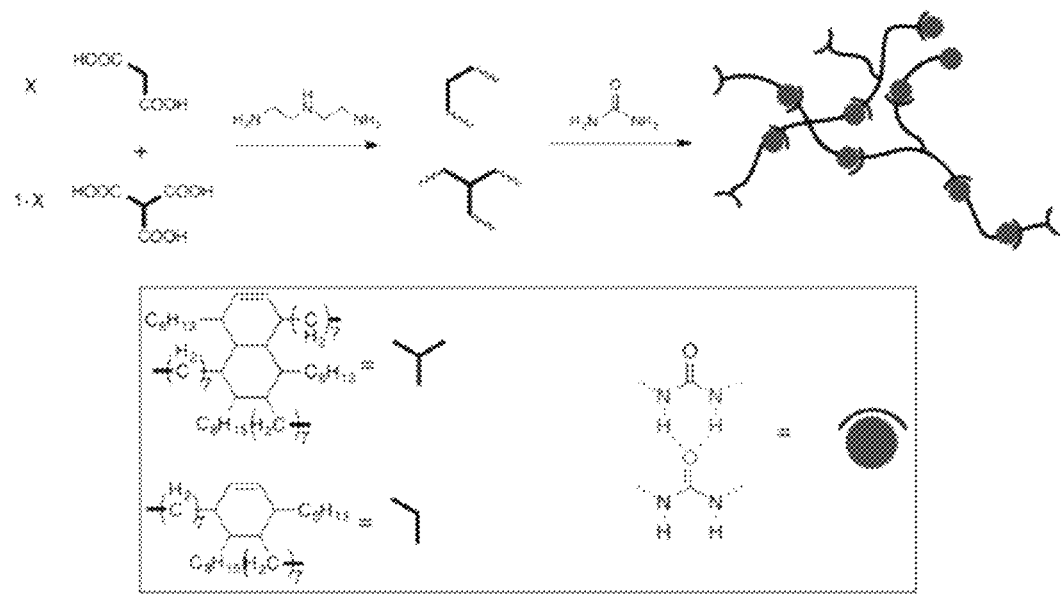
FIGS. 20A-20C.

In order to optimize the modification for the lithium metal anode, it is proposed to tune the molecular structure of the SHP. FIG. 20A shows the general design of the hydrogen bonding in the SHP. It is composed of a polymer backbone, hydrogen bonding sites and covalent cross-linking sites. The polymer backbone holds the main frame of the polymer and provides functional sites for functionalization of hydrogen bonding groups and other covalent cross-linking sites. The hydrogen bonding provides the polymer with self-healing capability. The covalent cross-linking sites are used to further tune the mechanical properties of the polymer. By controlling the polymer molecular structure, SHPs with varying mechanical strength and self-healing properties can be attained.

A condensation reaction between oleic acids and diethylene triamine is used to obtain the initial polymer backbone (FIG. 20A). The oleic acids (a mixture of alkyl dimer acids and trimer acids) have long alkyl moieties, making the polymer chain dynamic and mobile. After the condensation, the end of the polymer backbone will be terminated with amine groups, which can be readily converted into other functional groups. A series of polymer backbones with different molecular weights and structures can be synthesized to investigate the correlations between backbone structures and self-healing properties as well as the battery performance. The self-healing process is driven by the association and dissociation of hydrogen bonds.

Figure 20B:
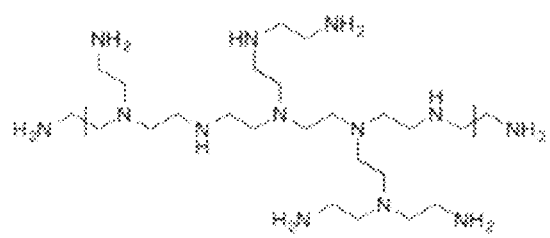
Figure 20C:
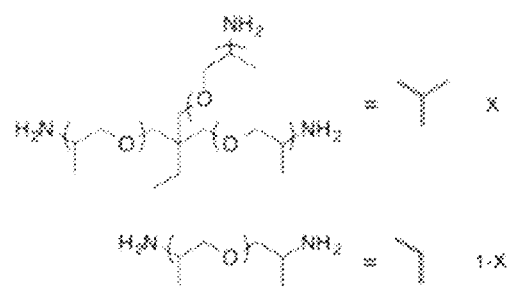

Polyethyleneimine (PEI) and polypropylene oxide (PEO) are alternative backbone structures. Different backbone chemistry can be used to alter the interaction of the polymer with the electrolyte and active materials as well as providing further control over the mechanical and healing properties (FIGS. 20B and 20C).

Example 4

Flowable Polymers for Lithium Metal Anodes

In addition to the above examples of self-healing polymers, a number of other flowable polymers with one or more of the following characteristics can function as protective layers or coatings for lithium metal anodes:

1. Ability for polymer chains to move at room temperature or close to room temperature (e.g., below about 50° C.). Suitable polymers can have a low glass transition temperature, such as no greater than or below about 25° C., no greater than or below about 0° C., or no greater than or below about −25° C.

2. Polymer includes dynamic bonds, such as hydrogen bonds, relatively weak metal-ligand bonds, electrostatic interactions, or a combination of two or more of the foregoing.

3. Polymer may or may not be cross-linked through weak dynamic bonds in addition to covalent bonds. There can be two or more cross-linked polymer networks interpenetrating with each other.

Figure 21:
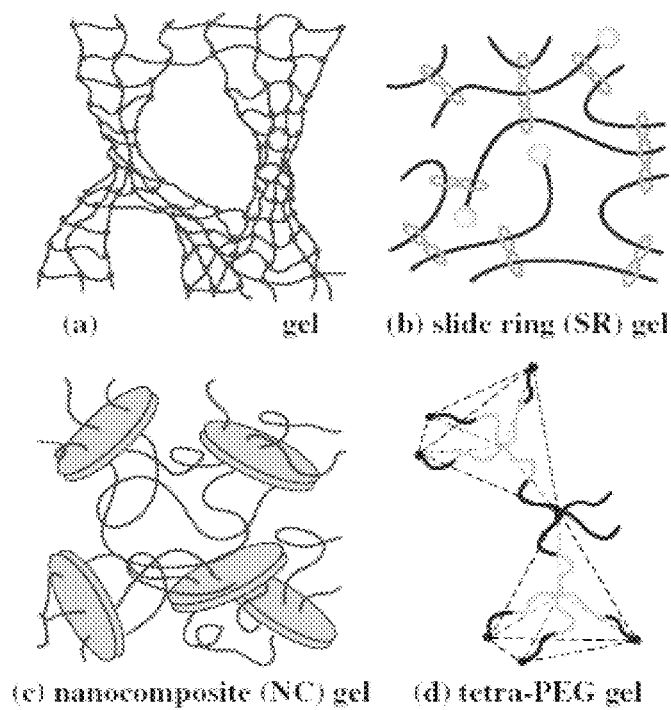
FIG. 21. Gel in (a) and examples of tough polymer networks in (b-d).

4. Tough polymer networks (see examples of tough polymer hydrogels in FIG. 21).

As used herein, the singular terms "a," "an," and "the" include plural referents unless the context clearly dictates otherwise. Thus, for example, reference to an object can include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in connection with a numerical value, the terms can encompass a range of variation of less than or equal to ±5% of that numerical value, such as less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "nanometer range" or "nm range" refers to a range of dimensions from about 1 nm to about 1 The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 µm.

As used herein, the term "micrometer range" or "µm range" refers to a range of dimensions from about 1 µm to about 1 mm. The µm range includes the "lower µm range," which refers to a range of dimensions from about 1 µm to about 10 µm, the "middle µm range," which refers to a range of dimensions from about 10 µm to about 100 µm, and the "upper µm range," which refers to a range of dimensions from about 100 µm to about 1 mm.

As used herein, the term "nanostructure" refers to an object that has at least one dimension in the nm range. A nanostructure can have any of a wide variety of shapes, and can be formed of a wide variety of materials. Examples of nanostructures include nanowires, nanotubes, nanosheets, and nanoparticles.

As used herein, the term "nanowire" refers to an elongated nanostructure that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the µm range, and an aspect ratio that is about 5 or greater.

As used herein, the term "nanotube" refers to an elongated, hollow nanostructure. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the µm range, and an aspect ratio that is about 5 or greater.

As used herein, the term "nanoparticle" refers to a spherical or spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 5, such as about 1.

As used herein, the term "nanosheet" refers to a planar-like nanostructure.

As used herein, the term "microstructure" refers to an object that has at least one dimension in the µm range. A microstructure can have any of a wide variety of shapes, and can be formed of a wide variety of materials. Examples of microstructures include microwires, microtubes, and microparticles.

As used herein, the term "microwire" refers to an elongated microstructure that is substantially solid. Typically, a microwire has a lateral dimension (e.g., a cross-sectional dimension in the form of a width, a diameter, or a width or diameter that represents an average across orthogonal directions) in the µm range, a longitudinal dimension (e.g., a length) in the µm range, and an aspect ratio that is about 5 or greater.

As used herein, the term "microtube" refers to an elongated, hollow microstructure. Typically, a microtube has a lateral dimension (e.g., a cross-sectional dimension in the form of a width, an outer diameter, or a width or outer diameter that represents an average across orthogonal directions) in the µm range, a longitudinal dimension (e.g., a length) in the µm range, and an aspect ratio that is about 5 or greater.

As used herein, the term "microparticle" refers to a spherical or spheroidal microstructure. Typically, each dimension (e.g., a cross-sectional dimension in the form of a width, a diameter, or a width or diameter that represents an average across orthogonal directions) of a microparticle is in the µm range, and the microparticle has an aspect ratio that is less than about 5, such as about 1.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A battery electrode comprising:
   a current collector;
   an interfacial layer disposed over the current collector; and
   a lithium metal layer disposed between the current collector and the interfacial layer,
   wherein the interfacial layer includes a self-healing polymer including associative groups that form reversible hydrogen bonds with other associative groups within the self-healing polymer,
   wherein a thickness of the interfacial layer is in a range of 10 nm to 100 µm.

2. The battery electrode of claim 1, wherein the self-healing polymer is viscoelastic.

3. The battery electrode of claim 1, wherein the self-healing polymer has a percentage elongation-at-break of at least 30% and up to 500%.

4. The battery electrode of claim 1, wherein the self-healing polymer includes a matrix formed of molecules cross-linked through the reversible hydrogen bonds.

5. The battery electrode of claim 1, wherein the self-healing polymer has a glass transition temperature no greater than 25° C.

6. The battery electrode of claim 1, wherein a loss modulus of the self-healing polymer is greater than a storage modulus of the self-healing polymer at a temperature below 80° C. and a frequency below 10 Hz.

7. A battery comprising the battery electrode of claim 1.

8. The battery electrode of claim 4, wherein the molecules are cross-linked through urea groups.

9. The battery electrode of claim 4, wherein the molecules include first molecules each including two urea groups, and second molecules each including three urea groups.

* * * * *